United States Patent [19]
Kostrzewski et al.

[11] Patent Number: 6,167,155
[45] Date of Patent: Dec. 26, 2000

[54] METHOD OF ISOMORPHIC SINGULAR MANIFOLD PROJECTION AND STILL/VIDEO IMAGERY COMPRESSION

[75] Inventors: Andrew Kostrzewski, Garden Grove; Igor Ternovskiy, Rancho Palos Verdes; Tomasz P. Jannson, Torrance, all of Calif.

[73] Assignee: Physical Optics Corporation, Torrance, Calif.

[21] Appl. No.: 08/901,832

[22] Filed: Jul. 28, 1997

[51] Int. Cl.[7] .................................................... G06K 9/36
[52] U.S. Cl. ......................... 382/232; 382/236; 382/238; 348/700; 348/699; 348/409
[58] Field of Search ................... 382/236–239, 382/250, 232; 348/616, 700, 699, 390–394, 400–421; 386/111; 360/8

[56] References Cited

U.S. PATENT DOCUMENTS

| | | | |
|---|---|---|---|
| 5,122,873 | 6/1992 | Golin ...................................... | 348/390 |
| 5,227,878 | 7/1993 | Puri et al. .............................. | 348/416 |
| 5,353,061 | 10/1994 | Rodriguez et al. ..................... | 348/409 |
| 5,479,264 | 12/1995 | Ueda et al. ............................. | 386/111 |
| 5,488,419 | 1/1996 | Hui et al. ................................ | 348/402 |
| 5,493,345 | 2/1996 | Ishikawa et al. ....................... | 348/700 |
| 5,510,839 | 4/1996 | Hamano et al. ........................ | 348/402 |
| 5,515,114 | 5/1996 | Murata .................................... | 348/699 |
| 5,532,746 | 7/1996 | Chang ..................................... | 348/415 |
| 5,600,375 | 2/1997 | Wickstrom ............................. | 348/400 |
| 5,627,590 | 5/1997 | Hamano et al. ........................ | 348/402 |
| 5,642,239 | 6/1997 | Nagai ........................................ | 360/8 |
| 5,682,204 | 10/1997 | Uz et al. ................................. | 348/409 |
| 5,724,100 | 3/1998 | Kuchibhotla ........................... | 348/420 |
| 5,751,378 | 5/1998 | Chen et al. ............................. | 348/700 |
| 5,793,895 | 8/1998 | Chang et al. ........................... | 382/236 |
| 5,835,163 | 11/1998 | Liou et al. .............................. | 348/700 |
| 5,844,628 | 12/1998 | Hamano et al. ........................ | 348/616 |
| 5,847,767 | 12/1998 | Ueda ....................................... | 348/423 |
| 6,008,847 | 12/1999 | Bauschspies ........................... | 348/391 |

OTHER PUBLICATIONS

*Sov. Phys. Usp.* 34(6), Jun. 1991, "Methods of the theory of singularities in the phenomenology of phase transitions", by E.I. Kut'in et al., pp. 497–498, 500–501, 507–508, 513.
*Computer Design*, Jul. 1993, "Realtime video compression poses challenges to designers and vendors alike", by Jeffrey Child, pp. 67–68, 70, 82, 84, 71–72, 76–78, 80.
*Proceedings of the IEEE*, vol. 82, No. 6, Jun. 1994, "Evaluating Quality of Compressed Medical Images: SNR, Subjective Rating, and Diagnostic Accuracy", by Cosman et al., pp. 919–932.

*Primary Examiner*—Leo H. Boudreau
*Assistant Examiner*—Ishrat Sherali
*Attorney, Agent, or Firm*—Nilles & Nilles, S.C.

[57] ABSTRACT

Methods and apparatuses for still image compression, video compression and automatic target recognition are disclosed. The method of still image compression uses isomorphic singular manifold projection whereby surfaces of objects having singular manifold representations are represented by best match canonical polynomials to arrive at a model representation. The model representation is compared with the original representation to arrive at a difference. If the difference exceeds a predetermined threshold, the difference data are saved and compressed using standard lossy compression. The coefficients from the best match polynomial together with the difference data, if any, are then compressed using lossless compression. The method of motion estimation for enhanced video compression sends I frames on an "as-needed" basis, based on comparing the error between segments of a current frame and a predicted frame. If the error exceeds a predetermined threshold, which can be based on program content, the next frame sent will be an I frame. The method of automatic target recognition (ATR) including tracking, zooming, and image enhancement, uses isomorphic singular manifold projection to separate texture and sculpture portions of an image. Soft ATR is then used on the sculptured portion and hard ATR is used on the texture portion.

24 Claims, 24 Drawing Sheets

2-D CCD CONTRAST IMAGE

MAPPING POLYNOMIAL SURFACE

GRAPH OF SEGMENT
16'S CONNECTIONS
TO ADJACENT SEGMENTS

GRAPH OF SEGMENT
9'S CONNECTIONS
TO ADJACENT SEGMENTS

*FIG. 14A*

| $I\,pixel$ $o(1,1)$ | $I\,pixel$ $o(1,2)$ | ... |

*FIG. 14B*

| $I\,pixel$ $m(1,1)$ | $I\,pixel$ $m(1,2)$ | ... |

*FIG. 14C*

| $I\,pixel$ $d(1,1)$ | $I\,pixel$ $d(1,2)$ | ... |

$$\frac{I\,pixel}{o(1,1)} - \frac{I\,pixel}{m(1,1)} = \frac{I\,pixel}{d(1,1)}$$

| # | Category | Data Reduction in Fraction of Original | Reduced Data Rate | Object Category Description |
|---|----------|----------------------------------------|-------------------|-----------------------------|
| 1. | A | 100% | 128 kbps | Original; possibly with noise. |
| 2. | B | 75% | 96 kbps | Tiny details of the face (or other biological signature, such as a fingerprint or retina); slightly reduced texture; edges remain unchanged. |
| 3. | C | 50% | 84 kbps | Hardened edges, wrinkles, smooth transitions for face details. |
| 4. | D | 25% | 32 kbps | Heavily reduced texture, hard edges. |
| 5. | E | 10% | 12.8 kbps | Hard edges, "cartoon-type" faces. |

FIG. 19

METHOD OF ISOMORPHIC SINGULAR MANIFOLD PROJECTION AND STILL/VIDEO IMAGERY COMPRESSION

FIELD OF THE INVENTION

The present invention relates to image compression systems, and in particular relates to an image compression system which provides hypercompression.

BACKGROUND OF THE INVENTION

Image compression reduces the amount of data necessary to represent a digital image by eliminating spatial and/or temporal redundancies in the image information. Compression is necessary in order to efficiently store and transmit still and video image information. Without compression, most applications in which image information is stored and/or transmitted would be rendered impractical or impossible.

Generally speaking, there are two types of compression: lossless and lossy. Lossless compression reduces the amount of image data stored and transmitted without any information loss, i.e., without any loss in the quality of the image. Lossy compression reduces the amount of image data stored and transmitted with at least some information loss, i.e., with at least some loss of quality of the image.

Lossy compression is performed with a view to meeting a given available storage and/or transmission capacity. In other words, external constraints for a given system may define a limited storage space available for storing the image information, or a limited bandwidth (data rate) available for transmitting the image information. Lossy compression sacrifices image quality in order to fit the image information within the constraints of the given available storage or transmission capacity. It follows that, in any given system, lossy compression would be unnecessary if sufficiently high compression ratios could be achieved, because a sufficiently high compression ratio would enable the image information to fit within the constraints of the given available storage or transmission capacity without information loss.

The vast majority of compression standards in existence today relate to lossy compression. These techniques typically use cosine-type transforms like DCT and wavelet compression, which are specific types of transforms, and have a tendency to lose high frequency information due to limited bandwidth. The "edges" of images typically contain very high frequency components because they have drastic gray level changes, i.e., their dynamic range is very large. Edges also have high resolution. Loss of edge information is undesirable because resolution is lost as well as high frequency information. Furthermore, human cognition of an image is primarily dependent upon edges or contours. If this information is eliminated in the compression process, human ability to recognize the image decreases.

Fractal compression, though better than most, suffers from high transmission bandwidth requirements and slow coding algorithms. Another type of motion (video) image compression technique is the ITU-recommended H.261 standard for videophone/videoconferencing applications. It operates at integer multiples of 64 kbps and its segmentation and model based methodology splits an image into several regions of specific shapes, and then the contour and texture parameters representing the region boundaries and approximating the region pixels, respectively, are encoded. A basic difficulty with the segmentation and model-based approach is low image quality connected with the estimation of parameters in 3-D space in order to impart naturalness to the 3-D image. The shortcomings of this technique are obvious to those who have used videophone/videoconferencing applications with respect particularly to MPEG video compression.

Standard MPEG video compression is accomplished by sending an "I frame" representing motion every fifteen frames regardless of video content. The introduction of I frames asynchronously into the video bitstream in the encoder is wasteful and introduces artifacts because there is no correlation between the I frames and the B and P frames of the video. This procedure results in wasted bandwidth. Particularly, if an I frame has been inserted into B and P frames containing no motion, bandwidth is wasted because the I frame was essentially unnecessary yet, unfortunately, uses up significant bandwidth because of its full content. On the other hand, if no I frame is inserted where there is a lot of motion in the video bitstream, such overwhelming and significant errors and artifacts are created that bandwidth is exceeded. Since the bandwidth is exceeded by the creation of these errors, they will drop off and thereby create the much unwanted blocking effect in the video image. In the desired case, if an I frame is inserted where there is motion (which is where an I frame is desired and necessary) the B and P frames will already be correlated to the new motion sequence and the video image will be satisfactory. This, however, happens only a portion of the time in standard compression techniques like MPEG. Accordingly, it would be extremely beneficial to insert I frames only where warranted by video content.

The compression rates required in many applications including tactical communications are extremely high as shown in the following example making maximal compression of critical importance. Assuming $512^2$ number of pixels, 8-bit gray level, and 30 Hz full-motion video rate, a bandwidth of 60 Mbps is required. To compress data into the required data rate of 128 kbps from such a full video uncompressed bandwidth of 60 Mbps, a 468:1 still image compression rate is required. The situation is even more extreme for VGA full-motion video which requires 221 Mbps and thus a 1726:1 motion video compression rate. Such compression rates, of course, greatly exceed any compression rate achievable by state of the art technology for reasonable PSNR (peak signal to noise ratio) values of approximately 30 dB. For example, the fourth public release of JPEG has only a 30:1 compression rate and the image has many artifacts due to a PSNR of less than 20 dB, while H320 has a 300:1 compression ratio for motion and still contains many still/motion image artifacts.

The situation is even more stringent for continuity of communication when degradation of power budget or multi-path errors of wireless media further reduce the allowable data rate to far below 128 kbps. Consequently, state of the art technology is far from providing multi-media parallel channelization and continuity data rates at equal to or lower than 128 kbps.

Very high compression rates, high image quality, and low transmission bandwidth are critical to modern communications, including satellite communications, which require full-motion, high resolution, and the ability to preserve high-quality fidelity of digital image transmission within a small bandwidth communication channel (e.g. T1). Unfortunately, due to the above limitations, state of the art compression techniques are not able to transmit high quality video in real-time on a band-limited communication channel. As a result, it is evident that a compression technique for both still and moving pictures that has a very high compression rate, high image quality, and low transmission bandwidth and a very fast decompression algorithm would be of great benefit. Particularly, a compression technique having the above characteristics and which preserves high frequency components as well as edge resolution would be particularly useful.

In addition to transmission or storage of compressed still or moving images, another area where the state of the art is unsatisfactory is in automatic target recognition (ATR). There are numerous applications, both civilian and military, which require the fast recognition of objects or humans amid significant background noise. Two types of ATR are used for this purpose, soft ATR and hard ATR. Soft ATR is used to recognize general categories of objects such as tanks or planes or humans whereas hard ATR is used to recognize specific types or models of objects within a particular category. Existing methods of both soft and hard ATR are Fourier transform-based. These methods are lacking in that Fourier analysis eliminates desired "soft edge" or contour information which is critical to human cognition. Improved methods are therefore needed to achieve more accurate recognition of general categories of objects by preserving critical "soft edge" information yet reducing the amount of data used to represent such objects and thereby greatly decrease processing time, increase compression rates, and preserve image quality.

SUMMARY OF THE INVENTION

The present invention is based on Isomorphic Singular Manifold Projection (ISMP) or Catastrophe Manifold Projection (CMP). This method is based on Newtonian polynomial space and characterizes the images to be compressed with singular manifold representations called catastrophes. The singular manifold representations can be represented by polynomials which can be transformed into a few discrete numbers called "datery" (number data that represent the image) that significantly reduce information content. This leads to extremely high compression rates (CR) for both still and moving images while preserving critical information about the objects in the image.

In this method, isomorphic mapping is utilized to map between the physical boundary of a 3-D surface and its 2-D plane. A projection can be represented as a normal photometric projection by adding the physical parameters, B (luminance) to generic geometric parameters (X,Y). This projection has a unique 3-D interpretation in the form of a "canonical singular manifold". This manifold can be described by a simple polynomial and therefore compressed into a few discrete numbers resulting in hyper compression. In essence, any image is a highly correlated sequence of data. The present invention "kills" this correlation, and image information in the form of a digital continuum of pixels almost disappears. All differences in 2-D "texture" connected with the 2-D projection of a 3-D object are "absorbed" by a contour topology, thus preserving and emphasizing the "sculpture" of the objects in the image. This allows expansion with good fidelity of a 2-D projection of a real 3-D object into an abstract (mathematical) 3-D object and is advantageous for both still and video compression and automatic target recognition.

More particularly, using catastrophe theory, surfaces of objects may be represented in the form of simple polynomials that have single-valued (isomorphic) inverse reconstructions. According to the invention, these polynomials are chosen to represent the surfaces and are then reduced to compact tabulated normal form polynomials which comprise simple numbers, i.e., the datery, which can be represented with very few bits. This enables exceptionally high compression rates because the "sculpture" characteristics of the object are isomorphically represented in the form of simple polynomials having single-valued inverse reconstructions. Preservation of the "sculpture" and the soft edges or contours of the object is critical to human cognition of the image for both still and video image viewing and ATR. Thus, the compression technique of the present invention provides exact representation of 3-D projection edges and exact representation of all the peculiarities of moving (rotating, etc.) 3-D objects, based on a simple transition between still picture representation to moving pictures.

In a preferred embodiment the following steps may be followed to compress a still image using isomorphic singular manifold projections and highly compressed datery. The first step is to subdivide the original image, $I_o$, into blocks of pixels, for example 16×16 or other sizes. These subdivisions of the image may be fixed in size or variable. The second step is to create a "canonical image" of each block by finding a match between one of fourteen canonical polynomials and the intensity distribution for each block or segment of pixels. The correct polynomial is chosen for each block by using standard merit functions. The third step is to create a model image, $I_M$, or "sculpture" of the entire image by finding connections between neighboring local blocks or segments of the second step to smooth out intensity (and physical structure to some degree). The fourth step is to recapture and work on the delocalized high frequency content of the image, i.e., the "texture". This is done by a subtraction of the model image, $I_M$, generated during the third step from the original segmented image, $I_o$, created during the first step. A preferred embodiment of this entire still image compression process will be discussed in detail below.

Optimal compression of video and other media containing motion may be achieved in accordance with the present invention by inserting I frames based on video content as opposed to at fixed intervals (typically every 15 frames), as in prior art motion estimation methods. In accordance with the motion estimation techniques of the present invention, the errors between standard "microblocks" or segments of the current frame and a predicted frame are not only sent to the decoder to reconstruct the current frame, but, in addition, are accumulated and used to determine the optimal insertion points for I frames based on video content. Where the accumulated error of all the microblocks for the current frame exceeds a predetermined threshold which itself is chosen based upon the type of video (action, documentary, nature, etc.), this indicates that the next subsequent frame after the particular frame having high accumulated error should be an I frame. Consequently, in accordance with the present invention, where the accumulated errors between the microblocks or segments of the current frame and the predicted frame exceed the threshold, the next subsequent frame is sent as an I frame which starts a new motion estimation sequence. Consequently, I frame insertion is content dependent which greatly improves the quality of the compressed video.

The I frames inserted in the above compression technique may first be compressed using standard DCT based compression algorithms or the isomorphic singular manifold projection (ISMP) still image compression technique of the present invention for maximal compression. In either case, the compression techniques used are preferably MPEG compatible.

Additionally, using the motion estimation technique compression of the present invention, compression ratios can be dynamically updated from frame to frame utilizing the accumulated error information. The compression ratio may be changed based on feedback from the receiver and, for instance, where the accumulated errors in motion estimation are high, the compression ratio may be decreased, thereby increasing bandwidth of the signal to be stored. If, on the other hand, the error is low, the compression ratio can be increased, thereby decreasing bandwidth of the signal to be stored.

Because the present invention is a 3-D non-linear technique that produces high level descriptive image representation using polynomial terms that can be represented by a few discrete numbers or datery, it provides much higher image compression than MPEG (greater than 1000:1 versus 100:1 in MPEG), higher frame rate (up to 60 frames/sec versus 30 frames/sec in MPEG), and higher picture quality or peak signal to noise ratio (PSNR greater than 32 dB versus PSNR greater than 23 dB in MPEG). Consequently, the compression technique of the present invention can provide more video channels than MPEG for any given channel bandwidth, video frame rate, and picture quality.

DESCRIPTION OF THE DRAWINGS

FIG. 14 illustrates subtracting $I_M$ from $I_O$ in accordance with the present invention;

FIG. 19 is a table showing the results of data communication with varying data rates in accordance with the present invention.

DESCRIPTION OF THE PREFERRED EMBODIMENTS

Preliminary Discussion of the Mapping of Surfaces Using Catastrophe Theory

The following is a brief introduction to Catastrophe Theory which may be helpful in understanding novel compression methodology of the present invention. Further discussion may be found in B. I. Arnold, *Catastrophe Theory*, Springer-Verlag 1992, which is incorporated by reference herein.

Catastrophes are abrupt changes arising as a sudden response of a system to a smooth change in external conditions. In order to understand catastrophe theory, it is necessary to understand Whitney's singularity theory. A mapping of a surface onto a plane associates to each point of the surface a point of the plane. If a point on the surface is given coordinates $(x_1, x_2)$ on the surface, and a point on the plane is given coordinates $(y_1, y_2)$, then the mapping is given by a pair of functions $y_1=f_1(x_1, x_2)$ and $y_2=f_2(x_1, x_2)$. The mapping is said to be smooth if these functions are smooth (i.e., are differentiable a sufficient number of times, such as polynomials for example). Mappings of smooth surfaces onto a plane exist everywhere. Indeed, the majority of objects surrounding us are bounded by smooth surfaces. The visible contours of bodies are the projections of their bounding surfaces onto the retina of the eye. By examining the objects surrounding us, for instance, people's faces, the singularities of visible contours can be studied. Whitney observed that generically (for all cases bar some exceptional ones) only two kinds of singularities are encountered. All other singularities disintegrate under small movements of the body or of the direction of projection, while these two types are stable and persist after small deformations of the mapping.

Figure 1A:
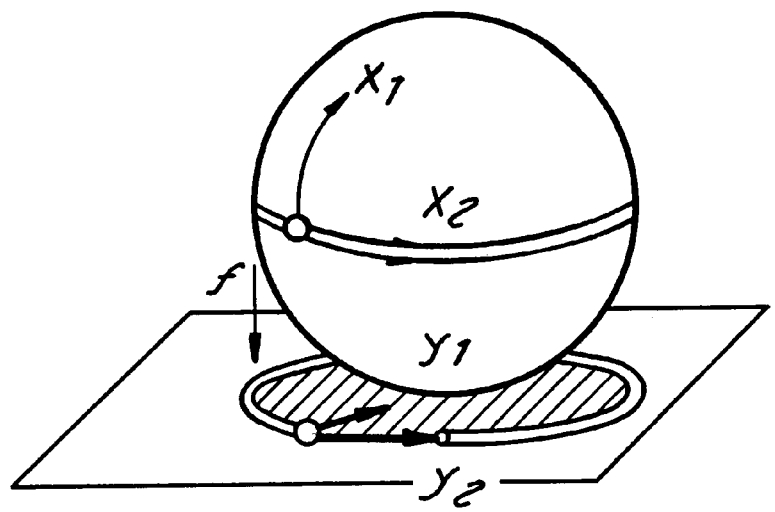
FIG. 1A illustrates a singularity called a "fold"

An example of the first kind of singularity, which Whitney called a fold, is the singularity arising at equatorial points when a sphere is projected onto a plane such as shown in FIG. 1A. In suitable coordinates, this mapping is given by the formulas $$y_1=x_1^2, y_2=x_2$$

The projections of surfaces of smooth bodies onto the retina have just such a singularity at generic points, and there is nothing surprising about this. What is surprising is that besides the singularity, the fold, we encounter everywhere just one other singularity, but it is practically never noticed.

Figure 1B:
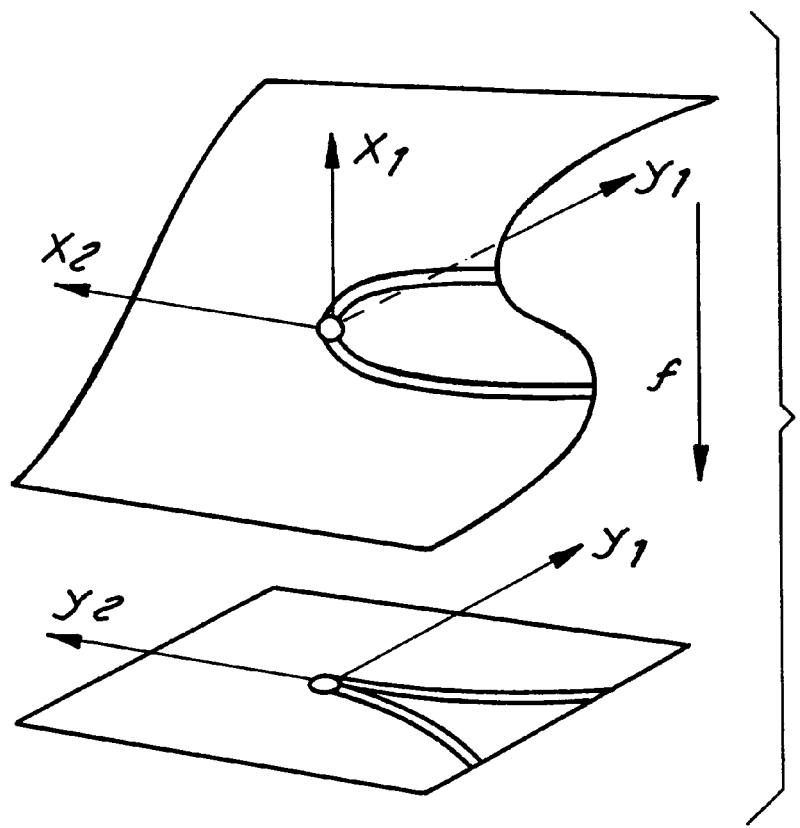
FIG. 1B illustrates a singularity called a "cusp"

The second singularity was named the cusp by Whitney, and it arises when a surface like that in FIG. 1B is projected onto a plane. This surface is given by the equation $$y_1=x_1^3+x_1x_2, y_2=x_2$$

with respect to spatial coordinates $(x_1, x_2, y_1)$ and projects onto the horizontal plane $(y_2, y_1)$.

On the horizontal projection plane, one sees a semicubic parabola with a cusp (spike) at the origin. This curve divides the horizontal plane into two parts: a smaller and a larger one. The points of the smaller part have three inverse images (three points of the surface project onto them), points of the larger part only one, and points on the curve, two. On approaching the curve from the smaller part, two of the inverse images (out of three) merge together and disappear (here the singularity is a fold), and on approaching the cusp all three inverse images coalesce.

Whitney proved that the cusp is stable, i.e., every nearby mapping has a similar singularity at an appropriate nearby point (that is, a singularity such that the deformed mapping, in suitable coordinates in a neighborhood of the point mentioned, is described by the same formulas as those describing the original mapping in a neighborhood of the original points). Whitney also proved that every singularity of a smooth mapping of a surface onto a plane, after an appropriate small perturbation, splits into folds and cusps. Thus, the visible contours of generic smooth bodies have cusps at points where the projections have cusp singularities, and they have no other singularities. These cusps can be found in the lines of every face or object. Since smooth mappings are found everywhere, their singularities must be everywhere also, and since Whitney's theory gives significant information on singularities of generic mappings, this information can be used to study large numbers of diverse phenomena and processes in all areas of science. This idea is the whole essence of catastrophe theory.

Technical Foundation of Catastrophic Theory

Catastrophic Manifold Projection (CMP) or Isomorphic Singular

Manifold Projection (ISMP)

The following glossary is a useful aid to understanding catastrophe theory because many of the terms used to describe it are uncommon in mathematics.

2-D Cartesian (Plane) Coordinates refer to standard (u, v) coordinates that describe a plane projection.

2-D Generalized Coordinates: ($\xi$,v) describe a system through a minimum number of geometrical coordinates (i.e., a number of degrees of freedom). These are usually curvilinear local coordinates, which belong to a specific surface in the vicinity of some point (i.e., origin of coordinates).

3-D Cartesian Coordinates refer to (x,y,z) describing a common surface in 3-D: F (x,y,z)=0.

3-D Cartesian (Hyperplane) Coordinates, are: (u, v, w), where (u, v) are 2-D (plane) Cartesian coordinates; w is a third, new physical coordinate, related to luminance (B) and describing a "gray level" scale color scale.

Arnold (Vladimir) is a Russian mathematician, who is a major contributor to catastrophe theory.

Arnold Theorem (Local Isomorphism) A family of transformations can transform any given mapping into a set of canonical transformations by using smooth substitutions of coordinates. The Arnold theorem defines local isomorphism in a sense that defines a class of locally isomorphic functions.

1. Arnold proved that Thom's theory can be represented in terms of group theory. 2. He also introduced an elegant theory for construction of the canonical form of singularities as they apply to wave front propagation in Lagrangian mechanics. 3. Furthermore, Arnold introduced methods based on using algebra of vector fields $$v = \sum_i R_i \frac{\partial}{\partial x},$$

where $R_i$ is a polynomial.

and introduced a method of spectral series for reduction of arbitrary functions to normal form. 4. Finally, he introduced classification of singularities and a method that described how to determine any type of singularity within a list of singularities.

Canonical Form is a generic mathematical term that can be defined in various ways. In the specific context of the Arnold theorem, the canonical form is the simplest polynomial, with the highest degree of monoms within the normal form area, representing a given type of catastrophe. The canonical form is represented by a segmented line in a Newton diagram.

Canonical Transformation permits transformation of real surface form (such as F (u, v, w)=0) into canonical form (i.e., superposition of Morse form and singular residuum, or Thom form) into two blocks of so-called canonical coordinates: regular and catastrophic.

Catastrophe (a term invented by Montel) is a specific manifold mapping feature by which some points lying in the projection plane can abruptly change location in manifold. More philosophically, it "describes the emergence of discrete structures from the typical surface described in the platform of continuum."

Catastrophes, Critical Number in 3-D (for mapping a generic surface onto a plane) is only two (2): fold and cusp (tuck). Using these two catastrophes is sufficient for static still imagery.

Catastrophes, Total Number in 3-D (for mapping a generic surface onto a plane) is fourteen (14). Only "fold"-catastrophe does not have degenerate points; all the (13) others have. Using all 14 catastrophes is necessary in hypercompression if we consider dynamic imagery (or video).

Catastrophic Manifold Projection is a fundamental concept of "3-D into 3-D" mapping, leading to hypercompression. This is diffeomorphic mapping, including geometrical coordinates (2-D generalized, and 2-D plane), as well as a fourth "photometric coordinate".

Catastrophic Manifold Projection (CMP) Law is mapping:

$$(\xi,v, B) \Leftrightarrow (u,v,w)$$

Thus, the CMP is "3-D into 3-D" mapping, with two types of coordinates: "geometrical"($\xi$, v); (u, v), and "photometric" (B, w).

The Critical Point is a point at which the rank of Jacobian is less than maximal (examples are maxima, minima, and bending points)

Datery result from a novel mathematical procedure leading to a tremendous compression ratio; instead of describing some surface by a continuum, we describe this singular manifold by a few low even numbers, i.e., datery. Therefore, during hypercompression, the surface as continuum "disappears", leaving typical data (such as computer data).

In a Degenerate Critical Point, the rank of Jacobian is a less than maximal rank minus one. This point can be a critical point of cusp catastrophes, for example.

Discrete Structures are singular manifolds that can be described by a set of discrete, usually even, data (e.g., (2,5,−1,3)), leading to datery instead of description by a continuum of points (such as F(x,y,z)=0). Such discrete structures (which are, in fact, continuums, but are still described by discrete sets), are typically referred to as singularities, bifurcation, or catastrophes.

Diffeomorphism is a stronger term than isomorphism (or homeomorphism), and means not only isomorphism, but also smooth mapping.

Field, a subset of a ring. (All non-zero field elements generate a group, by multiplication.) For example, the differential operator can be an element of a field.

Generalized Coordinates, or, more precisely, generalized coordinates of Lagrange, are such "natural" coordinates in solid state mechanics that their number is precisely equal to the number of a body's degrees of freedom: ($\xi,\nu,\eta, \ldots$)

A Generic Surface, in the context of the CMP method, is a mathematical surface which, within infinitesimal changes, does not have the same tangent (or projection line) for more than two points along any curve lying on this surface. In other words, a surface is generic if small changes to the surface do not lead to changes in singularities (such as splitting into less complex ones.) Physical surfaces are almost always generic because of noise tolerance.

A Group is the simplest set in mathematical models, with only a single operation.

Hypercompression is a specific compression term which provides a datery (i.e., "stripping" a continuum surface into its discrete representation). This is possible for the surface locality in the form of catastrophe.

Ideal is another subset of a ring. A subset of the ring is an ideal if this subset is a subgroup of the ring by summation. In the context of the Arnold theorem, this summation group is a set of all monoms that lie above the canonical form segmented line.

Isomorphic Singular Manifold Projection—see CMP.

Jacobian is a transformation matrix whose element, $H_{ij}$, can be presented in the form:

$$H_{ij} = \frac{\partial u_i}{\partial \xi_j}$$

where $u_i=(u,v,w)$ is the plane projection Cartesian coordinate system, $\xi_j=(\xi, \nu, \eta)$ is the generalized coordinate system, and $$\frac{\partial u}{\partial \xi}$$

describes a partial derivative.

Landau (Lev) was a Russian theoretical physicist, who won the Nobel Prize for superfluidity of the isotope helium $He_3$. He systematically applied the catastrophe theory approach before this theory was mathematically formulated [3].

The Landau Method, applied in the second-order phase transition, applies Thom's lemma in the form of the Taylor series, including only "important" physical terms.

Lie Algebra is an algebra belonging to the Lie groups with a binary operation (commutator).

A Lie Group is a group whose generator is an infinitesimal operator.

Locally Isomorphic functions have the same singular residuum (see Thom's lemma); thus, they can be compressed identically for "soft edges", or "object boundaries".

Manifold is a mathematical surface (curve or point) defined locally by a system of equations through local "canonical" coordinates, also called curvilinear (natural) coordinates, or generalized coordinates of Lagrange (known as generalized coordinates for short).

Mapping is a transformation in which $$u=f(\xi,\nu) \qquad (3)$$
$$v=g(\xi,\nu)$$

and vice versa. Mapping is smooth if functions f and g are smooth (i.e., differentiable a "sufficient" number of times: the highest level of "sufficient" differentiation is equivalent to the highest power of a polynomial describing a given manifold.

Figure 2A:
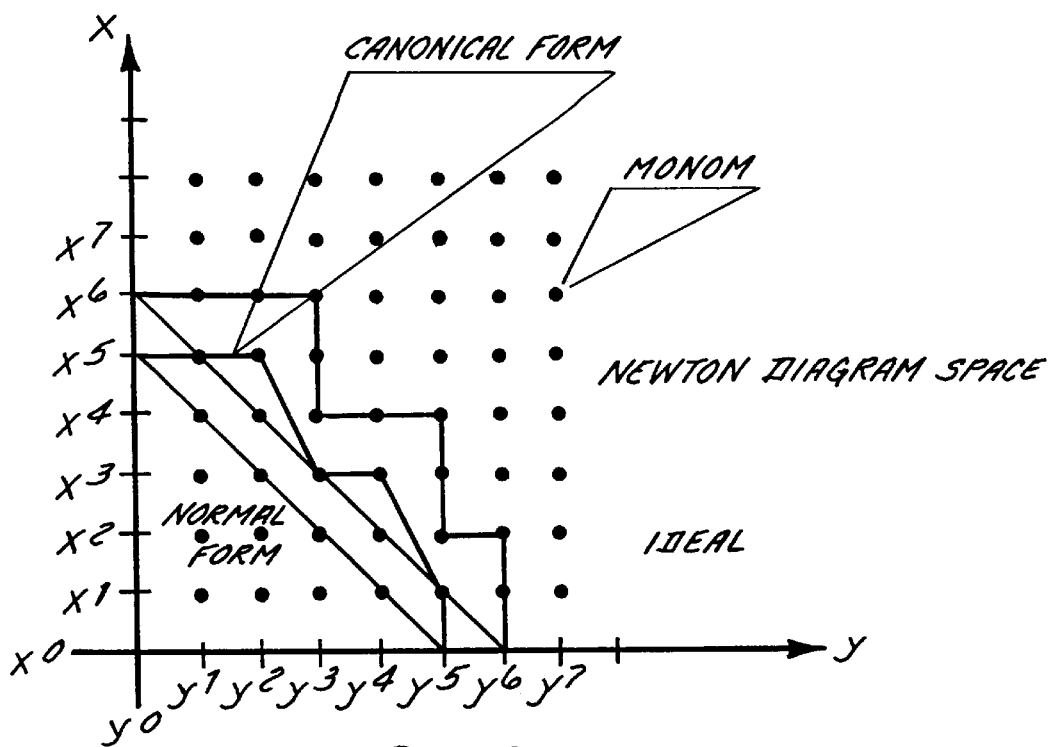
FIG. 2A illustrates "Newton Diagram Space" and contains "monoms" and polynomials.
Figure 2B:
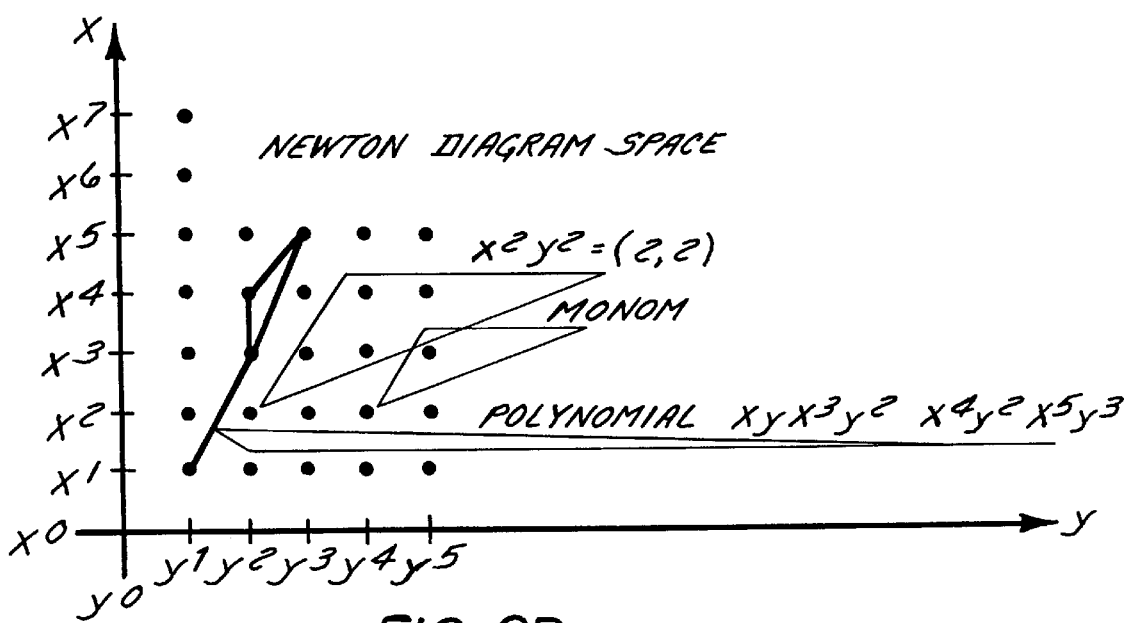
FIG. 2B illustrates the application of Newton diagram space in the context of ISMP Theory. Canonical and normal forms, etc.

A Monom is a point in Newton diagram space, describing a given polynomial term. For example, term: $x^3y$ is equivalent to the monom (3,1), a point in a Newton diagram (FIGS. 2A and 2B).

Morse was a French mathematician whose work was a precursor of catastrophe theory. At the beginning of the nineteenth century, he generalized a number of differential geometry theorems into a general class of generic surfaces.

Morse lemma: In the vicinity of a nondegenerate critical point of specific manifold mapping, a function describing specific manifold mapping in generalized coordinates can be reduced to a quadratic form.

A Newton Diagram is discrete (Cartesian) 2-D "point" space defined in such a way that the x-axis and the y-axis describe x-polynomial and y-polynomial power, respectively. For example, the $x^2y$-polynomial element is equivalent to point (2,1) in Newton table space. In this Newton diagram space, a given polynomial that is always normalized (i.e., with unit coefficients of $x^2+xy$, and not $x^2+3xy$) is described by a segmented line. See FIGS. 3A and 3B.

Nondegenerate Critical Point For this point, only one row of Jacobian is equal to zero (this point can be maximum or minimum, as referred to in the Morse lemma).

Normal Form is a set of monoms bounded by a canonical for segmented line (including the monoms of canonical form).

A Ring is the second most complex set in mathematical models, with two operations. Ring sub-sets can be field and ideal.

Stable Catastrophes are always two: fold and cusp (tuck). These cannot be "easily" transferred to another catastrophe by infinitesimal transformation although others can be. See FIGS. 1 and 2.

A Spectral Series is a method of sequential approximation (proposed by Arnold) that allows reduction of all catastrophe-equivalent polynomials to the canonical form, representing a given type of catastrophe.

Thom (Rene) was a French mathematician, considered to be the "father" of catastrophe theory (1959).

Thom's lemma is a fundamental theorem of catastrophe theory in general and the ISMP in particular, as a generalization of the Morse lemma for degenerate critical points. It claims that, in such a case, the algebraic form describing a surface can no longer be only quadratic, but consists of a quadratic form (as in the Morse lemma) and an additive singular residuum:

$$f = \sum_{i=n}^{s} k_i \alpha_i^2 + g(\alpha_{s+n}, \ldots, \alpha_n), k_i = \pm 1$$

These normalized coordinates are also separated into two parts: non-generate point coordinates (NPC) (i=1,2, . . . , s) and degenerate point coordinates (DPC) (i=s+1, s+2, . . . , n). In the residuum function $g(\alpha_{s+1}, \ldots, \alpha_n)$, the first- and second-order differentials vanish: $dg=d^2g=0$. Functions with the same g belong to a set of stable equivalent functions, or are locally isomorphic (Arnold).

The Thom Statement declares that there is a finite number of catastrophes (14) in 3-D space.

A Vector Field is a representation whose element provides a shift of polynomials in the Newton diagram (this shift does not need to be a translation).

Whitney (M.) (1955) was an American mathematician, and a major contributor to catastrophe theory. His major achievements were in studying mapping from surface to plane.

Whitney Theorem (Two Stable Catastrophes): The local normal form of the singularities of typical stable mappings from 2-D manifolds (in 3-D) to a plane can be either fold or cusp only. (Stable Mapping): Every singularity of smooth mapping of a surface onto a plane after an appropriate small perturbation splits into stable catastrophes only (fold and cusp). This theorem is applied in CMP hypercompression into still imagery.

The following references are referred to in the text that follows and are hereby incorporated by reference.
1. M. Born, E. Wolf, *Principles of Optics*, Pergamon Press, 1980.
2. T. Jannson, "Radiance Transfer Function," J. Opt. Soc. Am. Vol. 70, No. 12, 1980] pp. 1544–1549.
3. V. I. Arnold, *Catastrophe Theory* Springer-Verlag, NY, 1992.
4. V. I. Arnold, *Singularities of Caustics and Wave Fronts, Mathematics and Its Applications* (Sovien Series) Vol. 62, Kluwer Academic Publisher, 1990.
5. V. I. Arnold, *The Theory of Singularity and its Applications*, Academia Nazionale dei Lincei, 1993.
6. V. I. Arnold, S. M. Gusein-Zade, A. N. Varchenko, *Singularities of Differential Mapping*, Birkhäuser, Boston-Basel-Berlin, 1988.
7. R. Gilmore, *Catastrophe Theory for Scientists and Engineers*, John Wiley & Sons, New York, 1981.
8. P. Grey, *Psychology*, Worth Publishers, New York, N.Y., 1991.

The following are expanded definitions, theorems, and lemmas referred to in the discussion below:

Critical Point: For a function depending on n variables ($\xi \in R^n$ or n-dimensional magnified), a critical point is called nondegenerate if its second differential is a nondegenerate quadratic form. In other words, for this point, only one row of the Jacobian is equal to zero.

Noncritical Point: In the neighborhood of regular (or noncritical) point transformations of n local coordinates $\xi_i$ of a surface into coordinates $u_i$ on a mapping plane, the transformation can be written as:

$$u_i = u_i(\xi_1, \ldots, \xi_n), i=1, \ldots, n.$$

In this case, the Jacobian is always nondegenerate. This means that in the vicinity of this point, it is possible to do an isomorphical transformation according to the implicit function theorem:

$$\xi_i = \xi_i(u_1, \ldots, u_n), i=1, \ldots, n$$

Morse lemma: In the neighborhood of a nondegenerate critical point, a function may be reduced to its quadratic part, i.e., it may be written into the normal form $$u = \xi_1^2 - \ldots - \xi_k^2 + \xi_{k+1}^2 + \xi \quad (1)$$

for a certain local coordinate system ($\xi_1, \ldots, \xi_n$).

The meaning of this lemma is as follows: Since the Jacobian of any smooth function f is nonzero in the vicinity of any nondegenerate critical point, differential replacements, such as:

$$u_i = u_i(\xi_1, \ldots, \xi_n) \quad (2)$$

can transform this function into a nondegenerate quadratic form:

$$u_i = \sum_{i=1}^{n} k_i \xi_i \quad k = \pm \quad (3)$$

At a degenerate critical point, some eigenvalues of the Jacobian matrix are zero. The subspace spanned by the corresponding eigenvalues ($\xi_{s+1}, \ldots, \xi_n$) is a critical subspace and has a dimension equal to the co-rank of the critical point.

Function f can be written in the form defining Thom's lemma, which is fundamental to the ISMP:

$$u_j = \sum_{i=1}^{s} k_i \xi_i^2 + g(\xi_{s+1}, \ldots, \xi_n) \quad k_i = \pm 1 \quad (4)$$

where $g(\xi_{s+1}, \ldots, \xi_n)$ is a function (residuum) for which $dg=d^2g=0$.

All functions with the same g are called a differential equivalent. The term local isomorphical is used as another description of that class of function.

Thom's lemma provides a basis for an application mapping algorithm for any surfaces that can be mapped on an image plane.

Thom's form can be used as a nondegenerate function for image approximation, but using singularities analysis allows extraction of the most important information from an image.

1st Whitney Theorem. The local normal form of the singularities of typical mappings from two-dimensional manifolds to a plane (or to another two-dimensional manifold):

$$\text{cusp} \begin{cases} u = \xi^3 + \xi \eta \\ v = \eta \end{cases} \quad (5A)$$

$$\text{fold} \begin{cases} u = \xi^2 \\ v = \eta \end{cases} \quad (5B)$$

$$\text{regular} \begin{cases} u = \xi \\ v = \eta \end{cases} \quad (5C)$$

Figure 3A:
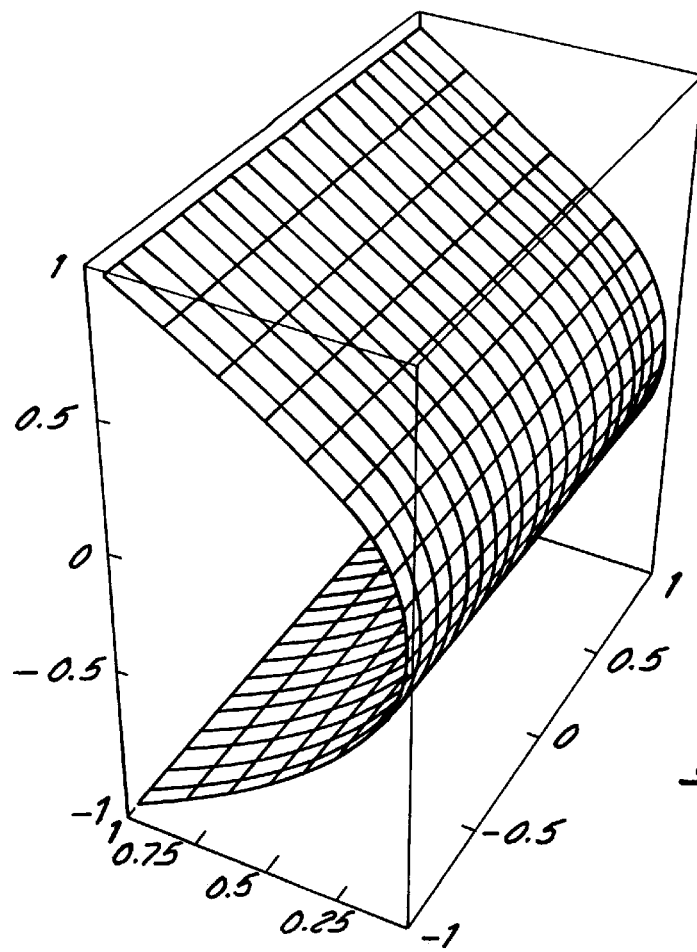
FIG. 3A depicts a fold.
Figure 3B:
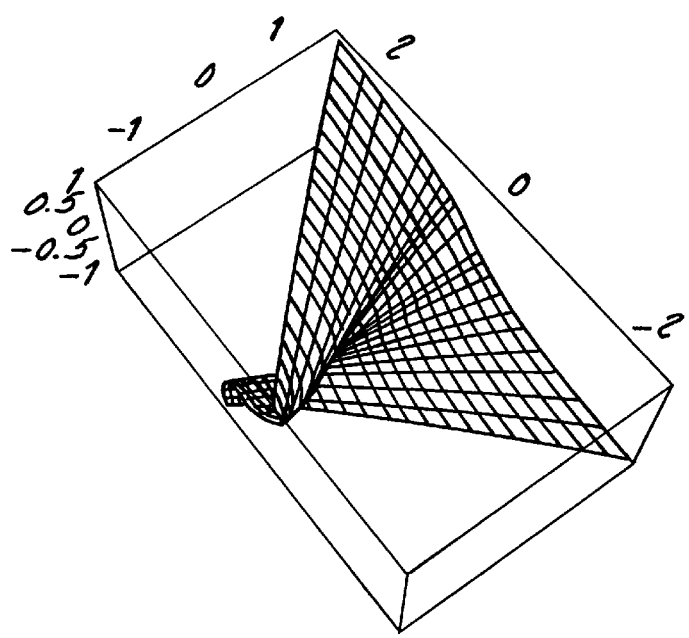
FIG. 3B depicts tuck.

Stable catastrophes (fold and cusp) are sufficient for still image compression. FIG. 3A depicts a fold and FIG. 3B depicts a cusp.

2nd Whitney Theorem: Every singularity of a smooth mapping of a surface onto a plane after an appropriate small perturbation splits into folds and cusps.

Arnold Theorem: There is a family of transformations that can transform any given mapping into a set of canonical transformations by using smooth substitution.

$$(\xi,\eta) \to (u,v)$$

$$u = u(\xi,\eta)$$

$$v = v(\xi,\eta) \tag{6}$$

then, by using smooth diffeomorphic transformation into new "plane" coordinates (u', v'), we obtain:

$$u' = a_1 u + a_2 v + a_3 u^2 + \ldots$$

$$v' = b_1 v + b_2 u + b_3 v^2 + \ldots \tag{7A}$$

$$u'' = c_1 u' + c_2 v' + c_3 u'^2 + \ldots$$

$$v'' = d_1 v' + d_2 u' + d_3 v'^2 + \ldots \tag{7B}$$

We can obtain $$u = M_1(\xi'',\eta'') + F_{C1}(\xi'',\eta'') + F_{C2}(\xi'',\eta'') + \ldots$$

$$v = M_2(\xi'',\eta'') + F_{C3}(\xi'',\eta'') + \ldots \tag{8}$$

where $M_1$ and $M_2$ are Morse forms and $F_{C1}$, $F_{C2}$, $F_{C3}$, ... are canonical (singular) forms.

In the Arnold theorem, Thom's lemma is applied in such a sense that we represent a Thom form (as in Eq. 8) by superposition of Morse (smooth) forms (M), and Thom residual forms ($F_C$). The proof of this theorem is based on spectral series reduction to normal forms. This is a local isomorphism (or, more precisely, local diffeomorphism), because each catastrophe is represented by a given canonical form, which, in turn, generates a normal form. Moreover, each catastrophe is represented by only one canonical form. Therefore, while general mapping is usually not isomorphic, in this specific case, Arnold mapping is. The consequence of the Arnold theorem, proven by his students Platonova and Shcherback, is a statement made earlier by Thom:

The number of nonequivalent singularities in the projections of generic surfaces in 3-D space, defined by the families of rays issuing from different points of space outside the surface, is finite and equal to 14.

Physical Modeling by Catastrophic Manifold Projection

Smooth Surfaces vs. Image Presentation

Usually, 3-D objects, presented in the form of 2-D images, are projections of the following types of objects:

1. Smooth artificial and natural objects: This category can be described as a projection of idealized surfaces on the image plane. In accordance with the human visual system, we first try to extract objects that can be presented by smooth surfaces ("soft edges").

Edges of smooth surfaces: These soft edges, which appear during mapping, are the same as the visible contours of smooth objects. (These objects ideally fit into the proposed approach.)

2. Sharp joints of objects: One example is the corners of buildings. (These jumps can also be naturally described by the proposed approach.)

3. Textures of an object: These objects will be described by the proposed method with natural scale parameters (including fractal type textures).

Physical Model Formulation

Figure 4A:
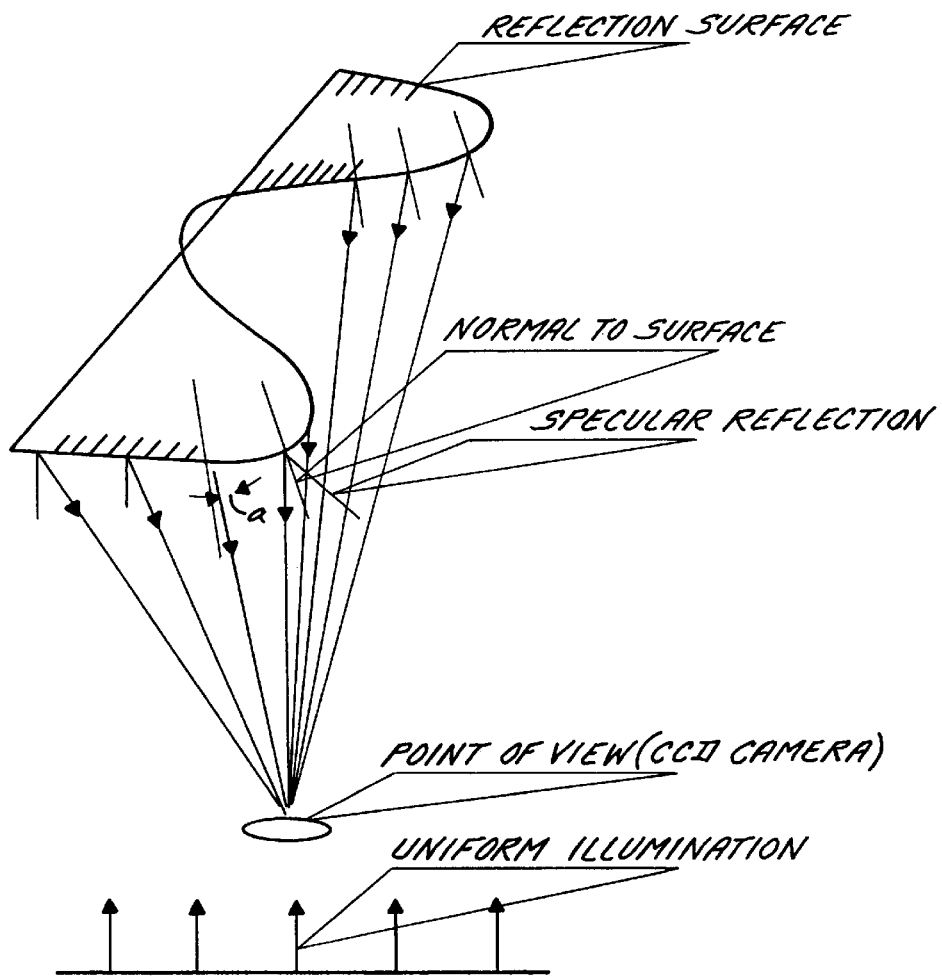
FIG. 4A illustrates a reflection from a manifold.
Figure 4B:
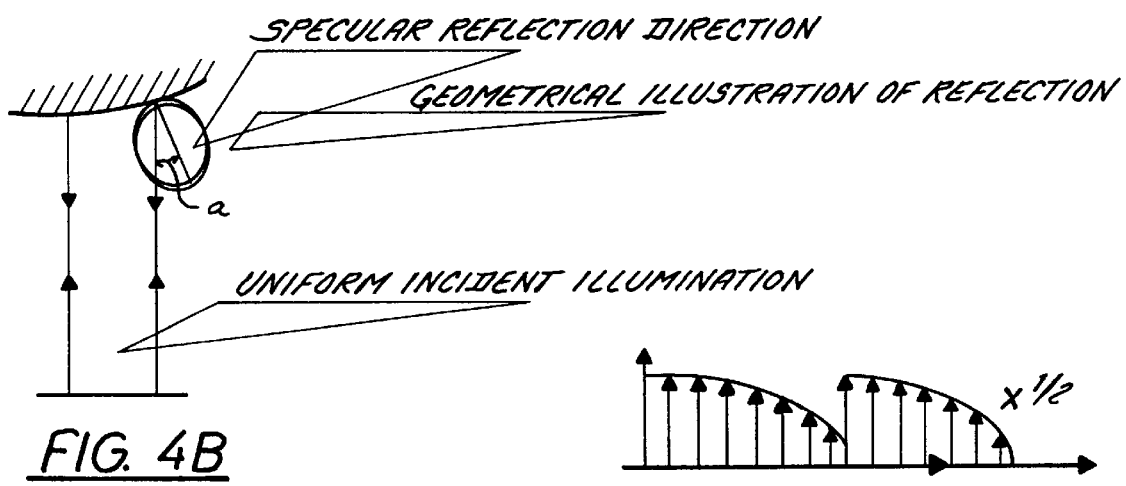
FIG. 4B illustrates the reflection from a manifold depending upon angle $\alpha$.
Figure 4C:
FIG. 4C illustrates the projection on a display.

Formation of an image can be described as light reflection from a general surface. It may be an actual radiation surface (light source, transparent surface, or semitransparent surface) or it may be an opaque reflected surface. We have introduced a photometric projection, so each ray is reflected backward only, in accordance with the radiance projection theorem [2]. The reflection is the highest in the specular direction, and it is monotonically reduced, with an increase of the reflection direction separation from the specular direction, as shown in FIG. 4. This photometric projection approach can be derived from Thom's lemma and the Arnold theorem.

If a reflection is identified with reflection surface luminance, B, the dependence of B on the direction will depend on the nature of the surface (whether it is smooth or rough). There is no general theory for arbitrary surfaces, although there are two limited cases: Lambert's cosine law, in which B is a constant (isotropic case), and the specular (mirror) reflection, in which incident light is reflected, without distortion, only in the specular direction. In a general case, we have intermediate distribution as seen in FIG. 4A which is a reflection from a manifold, 4B which is an explanation of reflection value depending upon angle $\alpha$, and 4C which is what would be displayed, for example, on a display. The presented photometric projection has a natural interpretation: the reflection value decreases when the $\alpha$-value increases, and vice versa.

Catastrophic Manifold Projection (CMP)

Inverse projection from a 2-D plane into the surface of a real object is analyzed. The geometry of this problem (i.e., photometric projection) has been shown in FIG. 4. Now, however, this inverse problem must be formulated in precise mathematical terms, allowing design of a suitable algorithm for hypercompression. To do this, the forward problem of image formation is formulated first.

In general, image formation can be presented as differential mapping from 4-D space (x, y, z, B; where x, y, z are real 3-D space coordinates of a point and B is the luminance of that point) to the image plane (u, v, w), where u and v are coordinates of a pixel and w is a color (or gray scale level) of the pixel. The result of mapping the manifold with internal curvilinear ($\xi$, $\eta$) coordinates will be a 3-D surface (u, v, w); where u, v are coordinates of the point into the plane and w is the luminance of the point.

The mapping will be:

$$u = f_1(x,y,z) \tag{9A}$$

$$v = f_2(x,y,z) \tag{9B}$$

$$w = f_3(x,y,z,B). \tag{9C}$$

or $$u = F_1(\xi,\eta) \tag{10A}$$

$$v = F_2(\xi,\eta) \tag{10B}$$

$$w = F_3(\xi,\eta,B) \tag{10C}$$

where $f_1$ and $f_2$ are regular projections of a surface to a plane, $f_3$ is luminance projection, and $F_1$, $F_2$, $F_3$ are their equivalents in the curvilinear coordinate system ($\xi,\eta$).

To formulate the isomorphic singular manifold projection (ISMP) problems by applying Thom's lemma formalism (i.e., canonical form, catastrophes, etc.), one must realize first that the w (B)—dependence is a smooth monotonic one, since both w and B are various forms of luminance, in such a sense that B is the physical luminance, while w is its representation in the form of color (gray level) in the CCD plane. But, smooth dependence does not contain critical points (even nondegenerate ones). Therefore, Thom's (splitting) lemma can be applied to Function (10), in the form:

$$w=M(B,\xi,\eta), \text{ or} \tag{11A}$$

$$w=M(B,\xi)+g(\eta), \text{ or} \tag{11B}$$

$$w=M(B,\eta)+g(\xi), \text{ or} \tag{11C}$$

$$w=M(B)+g(\xi,\eta), \tag{11D}$$

where the first function M represents a monotonical function of B or (function without critical points), and g ($\xi$, $\eta$) represents all singularities of projection influencing a gray scale level (color) of a given point (i.e., g-function represents a singular Thom residuum).

In order to show this, Function (10C) is expanded into infinite Taylor series, in the vicinity of $\xi_0$, $\eta_0$, and $B_0$, in the form:

$$w = w_0 + \frac{1}{1!}\frac{\partial F_3}{\partial \xi}\bigg|_{\xi_0}(\xi - \xi_0) + \frac{1}{1!}\frac{\partial F_3}{\partial \eta}\bigg|_{\eta_0}(\eta - \eta_0) + \tag{12}$$

$$\frac{1}{1!}\frac{\partial F_3}{\partial B}\bigg|_{B_0}(B - B_0) + \frac{1}{2!}\frac{\partial^2 F_3}{\partial \xi^2}\bigg|_{\xi_0}(\xi - \xi_0)^2 +$$

$$\frac{1}{2!}\frac{\partial^2 F_3}{\partial \eta^2}\bigg|_{\eta_0}(\eta - \eta_0)^2 + \frac{1}{2!}\frac{\partial^2 F_3}{\partial B^2}\bigg|_{B_0}(B - B_0)^2 +$$

$$\frac{1}{2!}\frac{\partial^2 F_3}{\partial \xi \partial B}\bigg|_{\xi_0 B_0}(\xi - \xi_0)(B - B_0) +$$

$$\frac{1}{2!}\frac{\partial^2 F_3}{\partial \eta \partial B}\bigg|_{\eta_0 B_0}(\eta - \eta_0)(B - B_0) + \dots$$

It should be noted that neither linear form of this Taylor series can be singular, by definition, and, therefore, neither is of interest. In relation to quadratic terms, coordinate substitution will be provided so that after this substitution, some free coefficients will be received that permit the zeroing of mixed quadratic terms (this approach is completely within the framework of Thom's lemma proof). On the other hand, the quadratic term $(B-B_0)^2$ is a Morse term. Therefore, it is demonstrated that there are no singular B-dependent terms. In summary, a luminance physical coordinate does not introduce new singularities, and, because g depends only on geometrical coordinates ($\xi,\eta$) (belonging to 3-D space manifold), all previous results of the Whitney-Thom-Arnold theory apply in this new geometrical/physical ("geophysical") 4-D space. (See Table 1.)

TABLE 1

| Type of singularity | Name of singularity | Formula | Singularity Applications |
|---|---|---|---|
| 0 | Regular | $u = \xi$<br>$v = \eta$ | Areas located on still image plane. |
| 1 | Fold | $u = \xi^2$<br>$v = \eta$ | Lines located on still image planes (contours of objects). |
| 2 | Cusp (Tuck) | $u = \xi^3 + \xi\eta$<br>$v = \eta$ | Points located on still image plane (with transitions to folds and regular point). Critical points necessary for recognizing images (such as corner of mouth, eyes, etc.). |
| 3–14 | Other | Not presented here due to complexity and lack of space. See Ref [3]. | Special directions of mappings for still images. Points of movie frames necessary for recognizing a motion (e.g., two-humped camel rotation). |

TABLE 1-continued

In order to explain these new results, a simple example of a homogeneous object with constant luminance B is considered.

EXAMPLE 1

Arbitrary Object with Constant Luminance

In such a case, Eq. (10C) does not contain B-dependence; i.e., it can be written in the following form:

$$w=F_3(\xi,\eta) \tag{13}$$

Now, the first two equations (10A) and (10B) can be used without changes, to introduce (u, v)—coordinates, in the form:

$$w=F(u(\xi,\eta), v(\xi,\eta)) \tag{14}$$

where F is some new function, and $$w=F_3(\xi,\eta). \tag{15}$$

It is clear that w-coordinate should have the same singularities as u and v (see Table 1).

In this case, all changes in color (gray level) will be determined only by mapping F and the contour of an object. Of course, the singularities for color w will be located at the same points as singularities of u and v. As a consequence, the singularities of color will be displaced at the contour of the object.

EXAMPLE 2

Cylinder with Given Luminance Dependence

Figure 5:
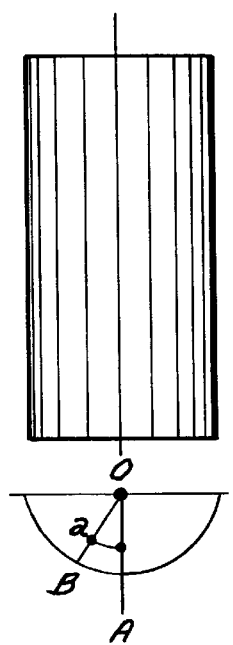
FIG. 5 illustrates a cylinder with constant luminance dependence.

Mapping of a cylinder with a given constant luminance dependence is shown in FIG. 5 and described as follows:

$$B=f(\xi,\eta). \tag{16}$$

In a cylindrical coordinate system (where axis y coincides with the axis of the cylinder), $x=\alpha$, where $\alpha$ is angle $\angle$BOA, and z is distance OB (or, radius).

Two parametric coordinates, $\xi=\alpha$, where $\alpha$ is angle $\angle$BOA (A is the central point of cylinder, B is a given point); y is the axial coordinate, and z (=R, where R is const) is the radius vector (OB). That the w-parameter must be proportional to B, everywhere must be taken into account. This means that B does not create any singularities. For new coordinates on the image plane:

$$u=R \sin(\xi) \tag{17A}$$

$$v=\eta \tag{17B}$$

$$w=C \cdot B+f(\xi,\eta); \ C=const \neq 0. \tag{17C}$$

On the other hand, a geometrical analysis of transformation Eq. (9A) shows that y– does not produce any singularities (since y is an axial coordinate). Therefore, it can be assumed, without loss of generality, that w depends only on x and B in the following form:

$$w = C \cdot B + f(u(\xi)) \quad (18)$$

or $$w = C \cdot B + f'(x) \quad (19)$$

where f'(x)=f(u(x)).

For critical point estimation, the Jacobian is considered, transforming coordinates ($\xi,\eta,B$) into (u, v, w) in the form:

$$H_{ij} = \begin{bmatrix} \frac{\partial u}{\partial x} & \frac{\partial u}{\partial y} & \frac{\partial u}{\partial z} \\ \frac{\partial v}{\partial x} & \frac{\partial v}{\partial y} & \frac{\partial v}{\partial z} \\ \frac{\partial w}{\partial x} & \frac{\partial w}{\partial y} & \frac{\partial w}{\partial z} \end{bmatrix} = \begin{bmatrix} R \cdot \cos(x) & 0 & 0 \\ 0 & 1 & 0 \\ C \frac{\partial B}{\partial u} \frac{\partial u}{\partial x} + \frac{\partial f}{\partial x} \frac{\partial u}{\partial x} & 0 & C \end{bmatrix} \quad (20)$$

or $$h_{ij} = \begin{bmatrix} R \cdot \cos x & 0 & 0 \\ 0 & 1 & 0 \\ \left( C \frac{\partial B}{\partial u} + \frac{\partial f}{\partial u} \right) R \cdot \cos(x) & 0 & C \end{bmatrix}$$

The first row of the matrix is not equal to 0, except $$x = \pm \frac{\pi}{2}$$

Therefore, it is possible to use a smooth transformation between (x, y, z) and (u, v, w).

$$(\xi, B) \rightarrow (u, w) \quad (21)$$

and there are no singularities for $$|x| \neq \frac{\pi}{2}$$

but if $$x = \pm \frac{\pi}{2}$$

the first row becomes 0 and the determinant equals 0. This means that in the case of $$x = \pm \frac{\pi}{2}$$

we cannot perform smooth variable substitution, and singularities exist in these points (projection of fold).

Let function w be represented in the expanded Taylor series:

$$w(\xi, B) = CB + f(\xi_0, B_0) + \frac{\partial f}{\partial u} \cdot \frac{\partial u}{\partial \xi} (\xi - \xi_0) + \ldots \quad (22)$$

The significance of a nondegenerate point $$x = \pm \frac{\pi}{2}$$

(fold) becomes clear if it is realized that even in the case of v, a weak dependence between w and x, $$\frac{\partial u}{\partial x}$$

grows to infinity (in the vicinity of $$x = \pm \frac{\pi}{2}).$$

Because the singularity appears as a result of geometrical mapping (not connected to changes of color), and we assume that the color of an object is a smooth function of coordinates $x_1$, $x_2$, it is possible to use a canonical function for representation of function f':

$$f'(x_1, x_3) = Bx_3 + c \cdot F(x_1)$$

where F is the deformation [3] of a canonical polynomial (fold or $x^{1/2}$ type dependance).

The calculations presented above do not use rigorous mathematical calculations, but they are very close to Lev Landau's approach, applied successfully to many areas of theoretical physics. In his approach, the art of throwing away "inessential" terms of the Taylor series, and preserving smaller size, yet "physically important" terms, has been rigorously proven through the course of the catastrophe theory [3].

Drawbacks of Fourier Analysis

Describing an arbitrary function by using a standard transform, such as Fourier or wavelet, is natural for periodic signal analysis. In image processing, however, these approaches have difficulties with describing very high redundancy regions with flat, slow-changing parts, as well as regions of abrupt change (or "soft edges"). Such classical description is unnatural for these types of objects because it creates excessively high input values in almost every coefficient of the Fourier transform as well as large coefficients in the case of the wavelet transform.

Figure 6:
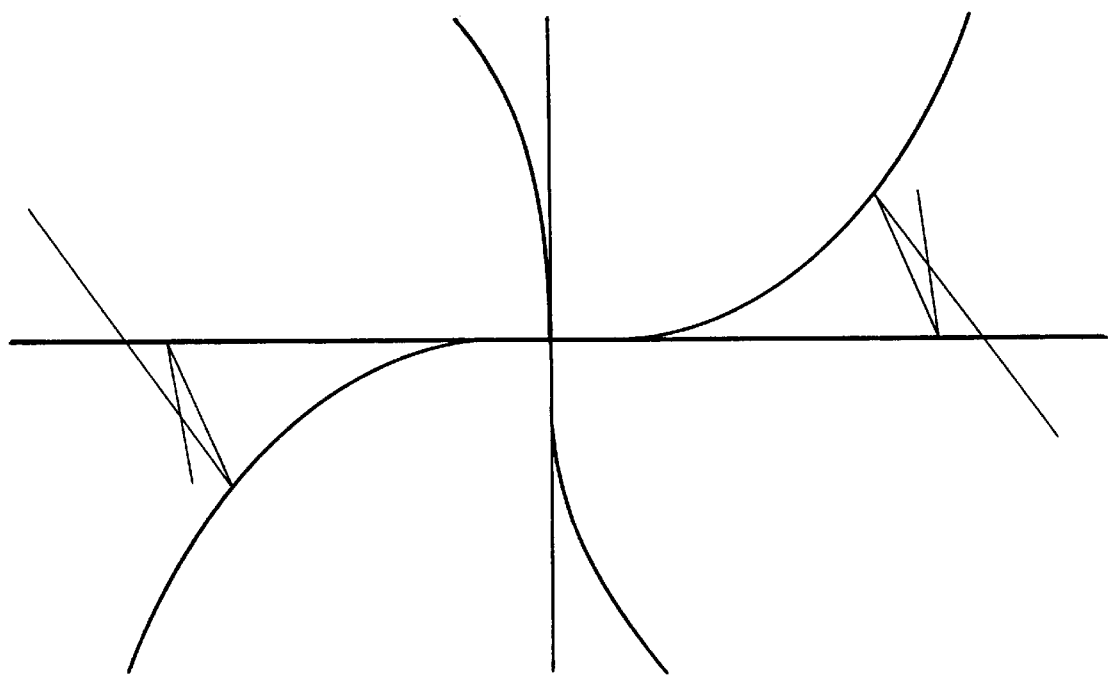
FIG. 6 illustrates an evolvement for $F=X^3$.

At the same time, starting from Leibniz, Huygens, and Newton, a clear geometrical (polynomial) approach was developed for an analysis of smooth curves and surfaces. As discovered recently, this approach has become strongly related to many major areas of mathematics, including group theory, regular polyhedrons, wave front propagation (caustics), and dynamic systems analysis. For a clear demonstration of the unique properties of this approach, consider the classic evolvent problem, formulated in Newton's time:

For example, for $f = x^3$, the evolvent presented in FIG. 6 can be constructed. Arnold [6] has shown that the evolvent is directly related to the $H_3$ group generated by reflections of an icosahedron. ($H_3$ is a group of symmetry of the icosahedron.) $H_3$ has special properties, as described below.

Figure 7A:
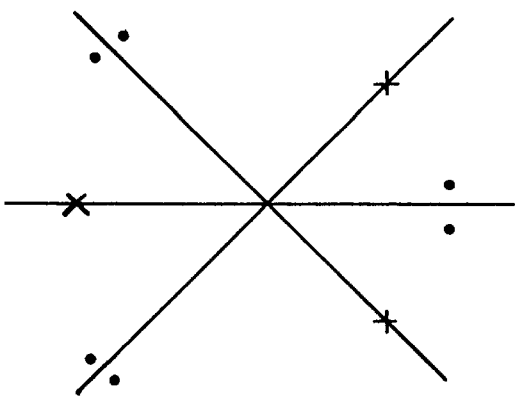
FIGS. 7A and 7B illustrate a reflector of a group for three mirrors $R^2$.
Figure 7B:
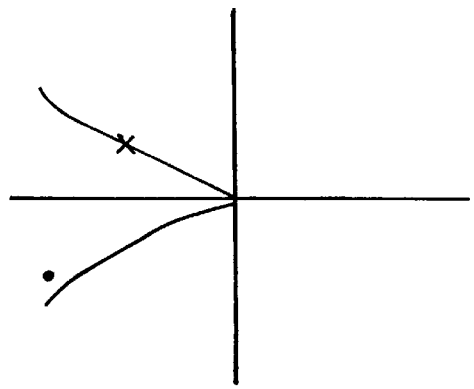

If complex space $C^3$ instead of $R^3$ is analyzed, the factor-space of $C^3$ for this group will be isomorphic to $C^3$. This means there exist some basic polynomial invariants. By using these invariants, any polynomials of this group can be represented (Arnold [6]). To illustrate this property in 2-D, let us describe a simplified example of three mirrors on $R^2$ as seen in FIGS. 7A and 7B.

The points of a plane that have an equal number of reflections (12 in FIG. 4A) belong to one (regular) orbit. Points located on the mirrors belong to another orbit. A set of all irregular orbits in a factor space is a discriminant (i.e., the manifold in a factor space).

Now the plane in 3-D space can be represented, as in FIG. 4, as a plane with coordinates $z_1$, $z_2$, $z_3$. The plane can be determined by:

$$z_1 + z_2 + z_3 = 0 \tag{23}$$

In this space, it is possible to introduce permutation of the axis, generated by reflections.

$$z_i = z_j \tag{24}$$

Orbits in this context constitute a set of numbers $\{z_1, z_2, z_3\}$ (with all permutations generated by reflections), with the additional condition of Eq. (23).

This unordered set will be uniquely determined by polynomials:

$$z^3 + \lambda_1 z^2 + \lambda_2 z + \lambda_3 = 0 \tag{25}$$

By using Eq. (25), the following is obtained:

$$\lambda_1 = 0$$

or $$z^3 + az + b = 0 \tag{26}$$

The space of the orbits of this group will be naturally presented by the roots of a cubic polynomial Eq. (26). This means that in factor space, this space is just a plane with coordinating (a, b).

Each point (a, b) of this space corresponds to a cubic polynomial and its roots. If some of the roots are equal, that means we have received irregular orbits.

The discriminant in this case is $$4a^3 + 27b^2 = 0 \tag{27}$$

which is of 3⁄2 type curve. This curve corresponds to specific orbits (in the mirrors) in FIG. 4A.

For all other types of groups generated by reflection, analogical construction of the discriminant exists.

It can be proven (Arnold; see Ref. [6]) that the surface creating the evolvent is diffeomorphical to the discriminant of the $H_3$ icosahedron group. As a result, by using the group representation, the redundancy of a mathematical object that is diffeomorphical to our mapping procedure has been greatly reduced.

Taking into account the symmetry of 3-D objects mapping (symmetry in a general sense, this means the Lie group, in this case) can optimally reduce redundancy and extract the information that describes the most important features of our object.

In summary, the polynomial representation of geometrical objects (starting from: Newton through Bernoulli, up to Thom and Arnold) seems to be more natural than the common Fourier (and wavelet) approach, because polynomials are connected to groups of symmetry that permit reduction in orbit redundancy in a most natural way.

Catastrophe Theory Applied to Still Image Compression

Because the most critical part of an object—its 3-D boundary—can be described by a 1-D contour and three or four natural digits or "coefficients" that characterize a simple catastrophic polynomial, tremendous lossless compression of object boundaries can be achieved, far exceeding state of the art compression ratios while still preserving high quality image. Since in all state of the art still image compression methods the major information loss is at the boundaries, applying ISMP compression which actually preserves the boundary or edge information, provides unparalleled fundamental compression ratio/PSNR trade off.

"Catastrophe" or alternatively isomorphic singular manifold as used here designates a mathematical object that describes the shape of 3-D object boundaries in polynomial form. The use of "catastrophe" theory for compression makes the present invention unlike all other compression methods because it helps to transmit information about 3-D object boundaries without loss, preserving the features of the object most valuable to human cognition, but with very high compression rate. By applying the present invention to still image compression, a 300:1 still image compression ratio with practically invisible artifacts (PSNR equal 32 dB) and a 4,000:1 full motion image compression ratio with fully developed natural motion and good image quality, is obtained.

The still image compression and related video compression technique of the present invention is extremely beneficial because, unlike other state of the art compression techniques, major information losses do not occur from compression at 3-D object boundaries (edges) that require both high dynamic range and high resolution (i.e., both high spatial and high vertical: "Lebesque" resolution). In these edges there is a vast amount of information necessary for many processing operations vital to a quality image and human cognition. The compression technique of the present invention, unlike other compression methods, preserves intact all "soft-"edge information without data loss. Hence, the present inventors have coined the term lossless-on-the-edges (LOTE) compression. LOTE compression is possible because of the fully isomorphic projection between the 3-D object boundary vicinity and its 2-D projection on the screen. This fully isomorphic projection between the 3-D object boundary and the 2-D projection is based on Arnold's so called "catastrophe" theory that has been adapted to still image compression here. The methodology of the present invention works especially well with objects that are closer to sculptures and objects that have mostly flat surfaces combined with edgy features, i.e., very low or high spatial frequencies. This is exactly the opposite of Fourier analysis which does not work well with very low or very high frequencies. For low frequency, Fourier analysis is unsatisfactory because the coefficients must be very well balanced and at the same time can easily be hidden in noise. For high frequency components of objects such as edges, many high frequency components exist which Fourier methods eliminate. These high frequency components are what make up all important edges of the object and eliminating them reduces human cognition. ISMP analysis on the other hand, does not have this problem because it characterizes edges and objects using manifolds and hence preserves the information that makes up those edges and that was eliminated in Fourier-based compression methods.

Specific Features of the Human Perception of Visual Information and Object Recognition An understanding of how humans recognize objects will make manifest the advantage of preserving information. The retina of the human eye contains millions of receptor cells, arranged in a mosaic-like pattern in the retinal layer. The receptor cells are cones and rods. These cones and rods provide the starting point for two separate but interacting visual systems within the human eye. Cone vision is specialized for high acuity and for perception of color. Rod vision is specialized for sensitivity and the ability to distinguish color (i.e., a person can make out the general shape of the objects, but not their colors or small details[8]).

The main purpose of human vision is not to detect simple presence or absence of light, but rather to detect and identify objects. Objects are defined principally by their contours. The visual system registers a greater difference in brightness between adjacent visual images, faithfully recording the actual physical difference in light intensity.

David Hubel and Thornton Wiesel (Nobel prize winners in 1981) recorded the electrical activity of individual neurons in the visual cortex. They found that these cells were highly sensitive to contours, responding best not to circular spots but rather to light or dark bars or edges. They classified these cells by using a complex hierarchical system, based on their different response characteristics. In this research, the authors outlined that the perception of long and linear bars provided maximum response in the human visual system.

Human brain zones, which decode specific properties of image recognition, are spatially organized in the brain according to their function. Thus, different localized sets of neurons in the visual cortex are specialized to carry codes for contours, color, spatial position and movement. This segregation of functions explains why a person who has had a stroke, which damaged part of the cortex, sometimes loses the ability to see contours without losing the ability to see colors.

Special mechanisms of object edge extraction in the human visual system allow extraction of important objects from a background, even if the object has bulk colors very close to the colors of the second plane. The latter feature is extremely important for registration of military targets, and makes ISMP an effective compression algorithm for ATR.

This still image compression performance can be transformed into analogous video image compression through the typical 10:1 factor for state of the art video image compression. Therefore, the inventive technique can be applied not only to high resolution digital video/still image transmission, but also to multi-media presentation, high quality video conferencing, video servers, and the storage of large amounts of video information.

Catastrophe Theory Applied to Video Compression

Video compression is a four dimensional (4-D) problem where the goal is to remove spatial and temporal redundancy from the stream of video information. In video there are scenes containing an object that continuously changes without jumps and has no edges, and, on the other hand, there are also scenes where there are cuts which are big jumps in the temporal domain or big jumps in the spatial domain (such as "edges"). These abrupt changes or jumps can be described as "catastrophes." Using catastrophe theory, these behaviors can be described by one or more elemental catastrophes. Each of these elemental catastrophes describes a particular type of abrupt change in the temporal or spatial domains. In general, categorizing catastrophes in 4-D space is even less established than catastrophe theory in general which is relatively unknown. Furthermore, 4-D space is far less understood than 3-D space but, similarities between them can be expected and projection-type mapping can be used, but in temporal space. One solution is to use spatial catastrophes along with temporal catastrophes.

In order to apply catastrophic theory to video imagery, a fourth "geometrical" coordinate, time leading to time-space (4-D) is preferably added. In the case of the inventive isomorphic singular manifold projection (ISMP) methodology, five-dimensional (5-D) geometro-physical space (x, y, z, t, B), where B is brightness, or luminance, is obtained. This 4-D time-space (x, y, z, t) plus physical coordinate, B, can be split into 4-D geometro-physical space, and time (t) and treated separately except in the case of relativistic velocities. In the latter, relativistic case, the 5-D space can be analyzed by Poincare group formalism. In the common, non-relativistic case, however, temporal singularities (catastrophic) may be described in the time-luminance (t, B) domain only. The time-luminance singularities may interfere with spatial singularities (previously discussed). In such a mode of operation, each block of the image is represented by a single time-variable value.

Figure 8:
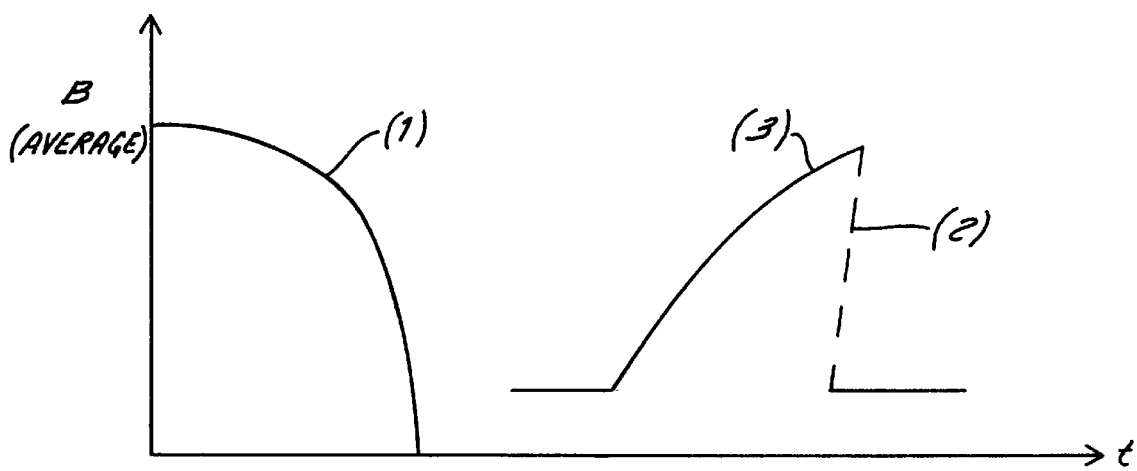
FIG. 8 illustrates a smooth curve projection, representing movement and a physical object, and a catastrophic frame change, and positionally zoom camera changes.

According to FIG. 8, there are only two possible singularities describing any type of mapping including smooth curve projection designated (1) shown in FIG. 8 where <B> is the average B-value characterizing a frame as a total structure (the smooth projection shown in FIG. 8 represents movement of a physical object. Item (2) in FIG. 8 representing a catastrophic frame change, and item (3) representing position/tilt/zoom camera changes. The critical <B>-parameter may be, for example, an average block-to-block error (e.g. mean square error). In summary, temporal catastrophic formalisms can be applied to MPEG hypercompression by replacing the average error parameters by integrated luminance-changes.

Canonical Polynomials

One way to represent these 4-D catastrophes is to use well known 3-D projections or mapping catastrophes which were discovered in the early 1980's. These "transformations" or "reconstructions" or "metamorphoses" in time are 4-D problems which can be separated into two 3-D problems: 1) Spatial catastrophes may be defined in 3-D space (x, y, B) such as occurs when there is a large change in intensity, B, over a small change in x, y; −2) temporal catastrophes may also be defined temporally such as occurs where there is an abrupt change in motion over time such as is present during the rotation of an object or a cut from one scene to another. The 3-D temporal problem can be further reduced to a 2-D problem by transferring the (x, y, B) coordinates into 1-D merit space. Merit space is defined by the lack of similarity between frames in time.

Images are 3-D distributions of intensity. Abrupt changes in intensity occurring over small changes in x, y may be treated as catastrophic changes. The inventors have modified catastrophe theory to fit images and to solve the problems of image and video compression. The inventors have introduced a physical coordinate, B (luminance) into conventional geometrical coordinates to create "geometro-physical" surfaces.

There exists a finite list of fourteen polynomials or "germs" which describe different edge transitions or projections in mapping in 3-D space. Typically, only about three of these polynomials or germs are necessary to describe virtually every edge effect. The others are used on occasion to describe spatial projections.

The germs of the projections are equivalent to the germs of the projections of the surfaces z=f(x,y) along the x-axis. The table below identifies the fourteen polynomials or germs.

| Type | f(x,y) | Type | f(x,y) |
|------|--------|------|--------|
| 1 | x (without singularities) | 8 | $x^4 + x^2y + xy^2$ |
| 2 | $x^2$ (fold) | 9, 10 | $x^5 \pm x^3y + xy$ |
| 3 | $x^3 + xy$ (Whitney's tuck) | 11, 12 | $x^3 \pm xy^4$ |
| 4, 5 | $x^3 \pm xy^2$ (3/1 type curve) | 13 | $x^4 + x^2y + xy^3$ |
| 6 | $x^3 + xy^3$ (9/2 type curve) | 14 | $x^5 + xy$ |
| 7 | $x^4 + xy$ (4/3 type curve) | | |

In theory, a projection of a surface does not have any germs that are inequivalent to the fourteen germs in the above table. It should be understood that the Spectral Series for Reduction to the Normal Form (SSRNF) method is used for the unique reduction of the arbitrary polynomial to the germs presented in the above table. It is presented here only in a descriptive form:

Let $e_1, \ldots, e_n$—quasihomogeneous polynomial (N+p degree) that generates $$A_p^{\tau+1}$$

for diffeomorphism.
Then, there is formal diffeomorphism $$A_p \to A_p^{\tau+1}$$
$$y_1 = x_1 + g_1,$$
$$\vdots$$
$$y_n = x_n + g_n, \sum g_n \frac{\partial}{\partial x_n} \in A_{p-\tau},$$

and that the series $f=f_0+f_1+\ldots$ after substitution has a form $$f(y_1, \ldots, y_n) = f_0(x) + f_1(x) + \ldots + f_{p-1} + \Sigma c_i e_i(x) + R, \ R \in A_{p+1}$$

and $c_i$ represent the numbers.

Catastrophe theory has not been before used for studying image intensity because the number of coefficients necessary to satisfactorily describe an image using standard polynomials is simply too large and can exceed the number of pixels present in an image. Obviously, such an analysis is not worthwhile because the data that need to be handled are larger than the number of pixels, itself a very large number. The inventors have discovered that it is possible to remove many of the details or "texture" in images, leaving the important "sculpture" of the image, prior to characterizing the image with polynomials, to significantly decrease the number of coefficients in the polynomials that describe the different edge transitions in mapping and 3-D space.

Preferred Still Image Encoding Method

Figure 9:
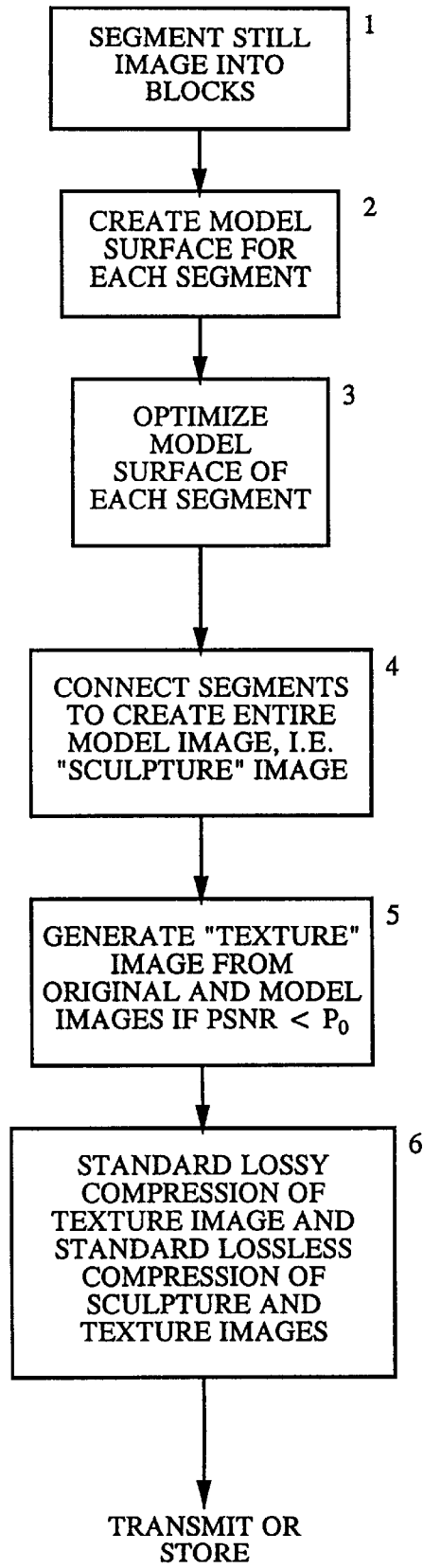
FIG. 9 is a abbreviated flow chart of the inventive ISMP still image compression method.
Figure 10A:
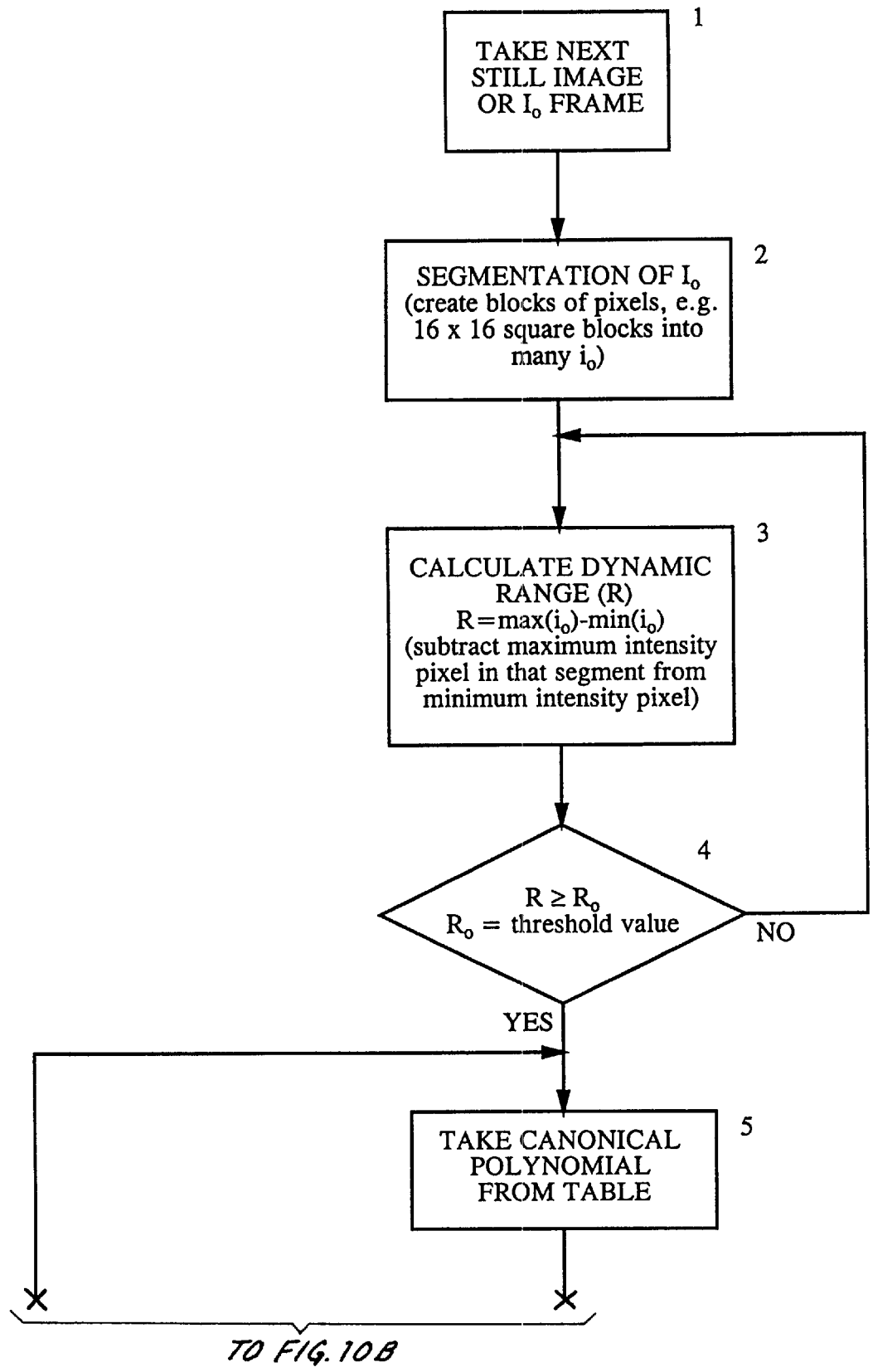
FIG. 10 is a detailed flow chart of the inventive ISMP compression method in accordance with the present invention.
Figure 10B:
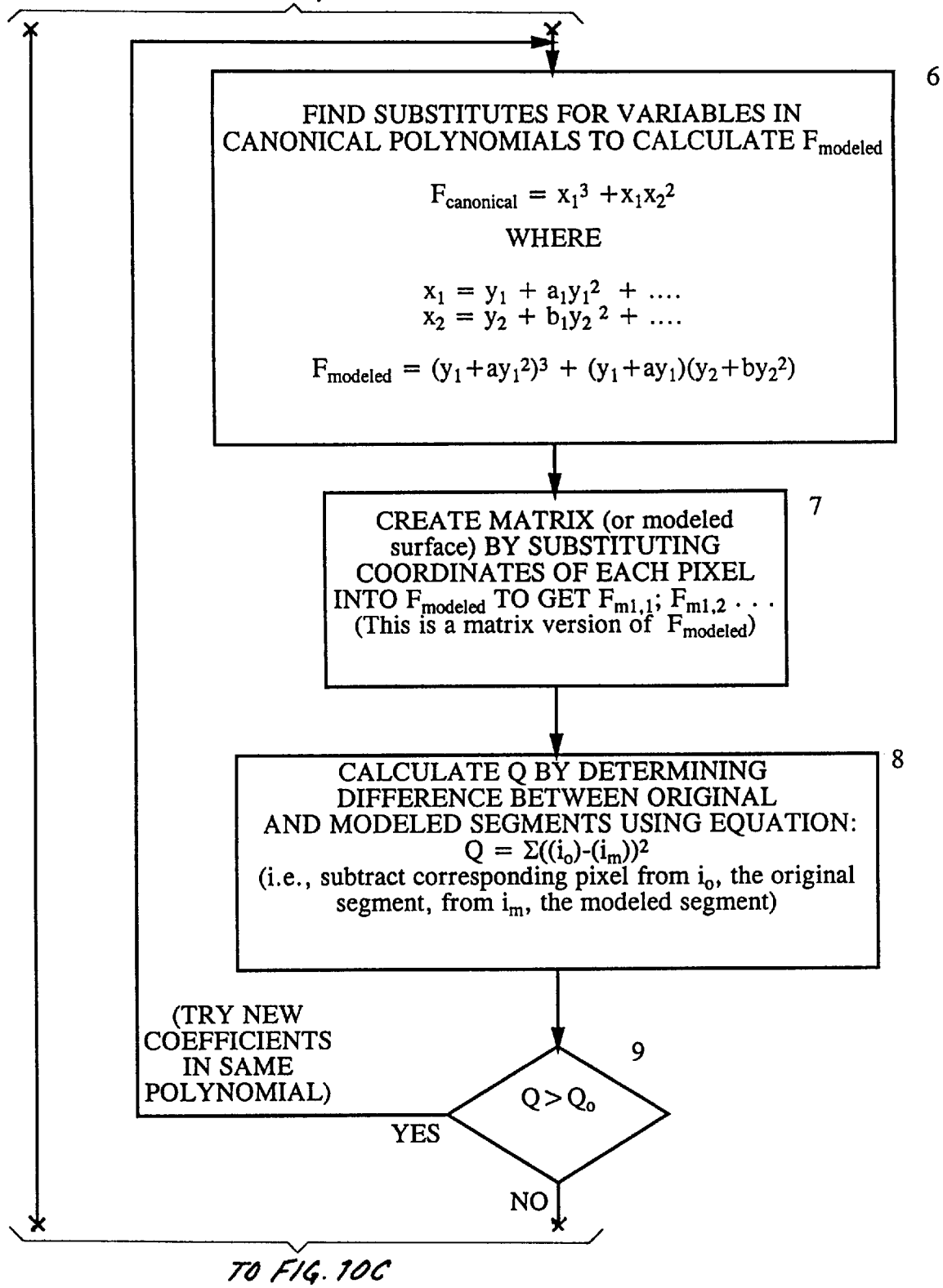
Figure 10C:
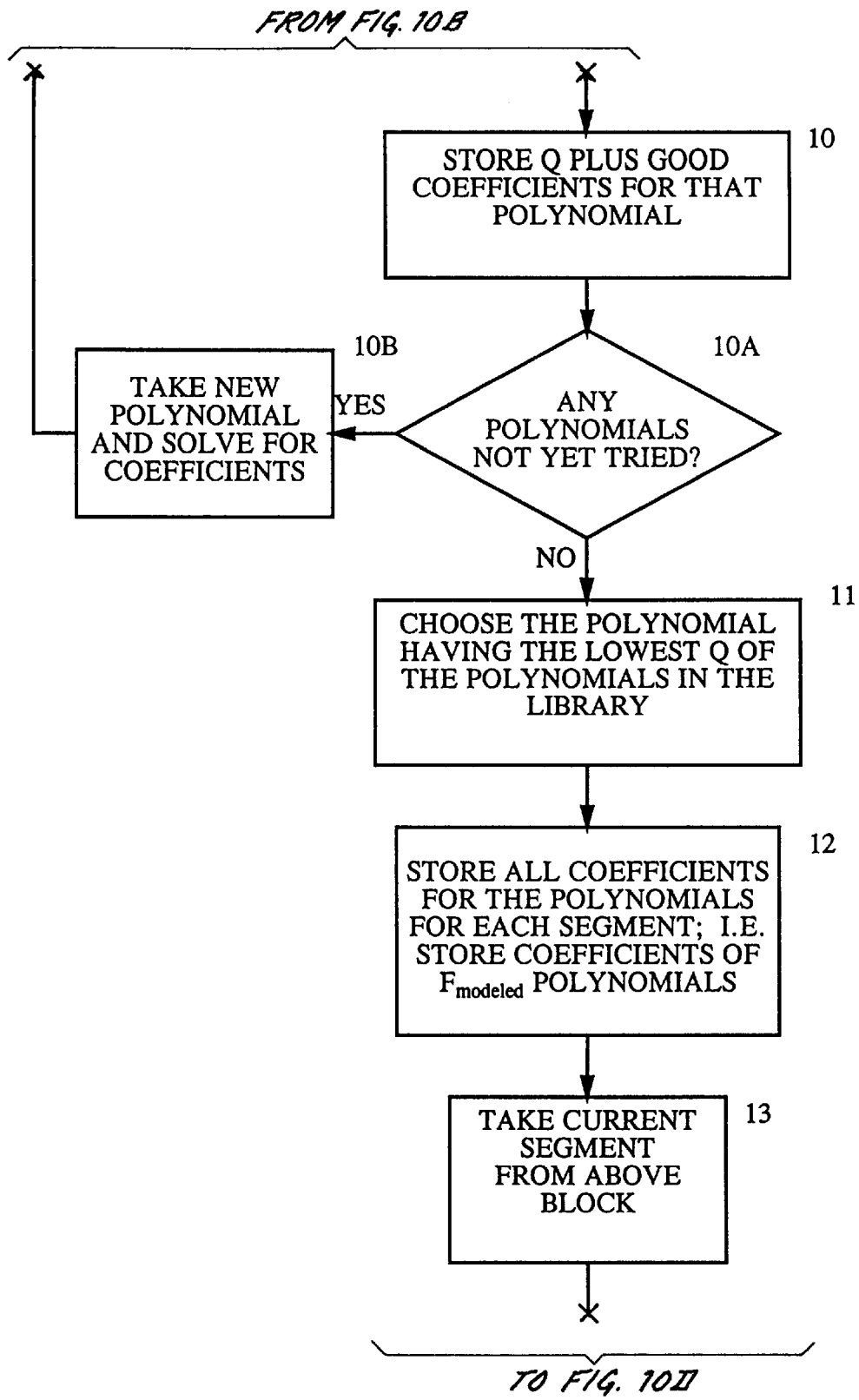
Figure 10D:
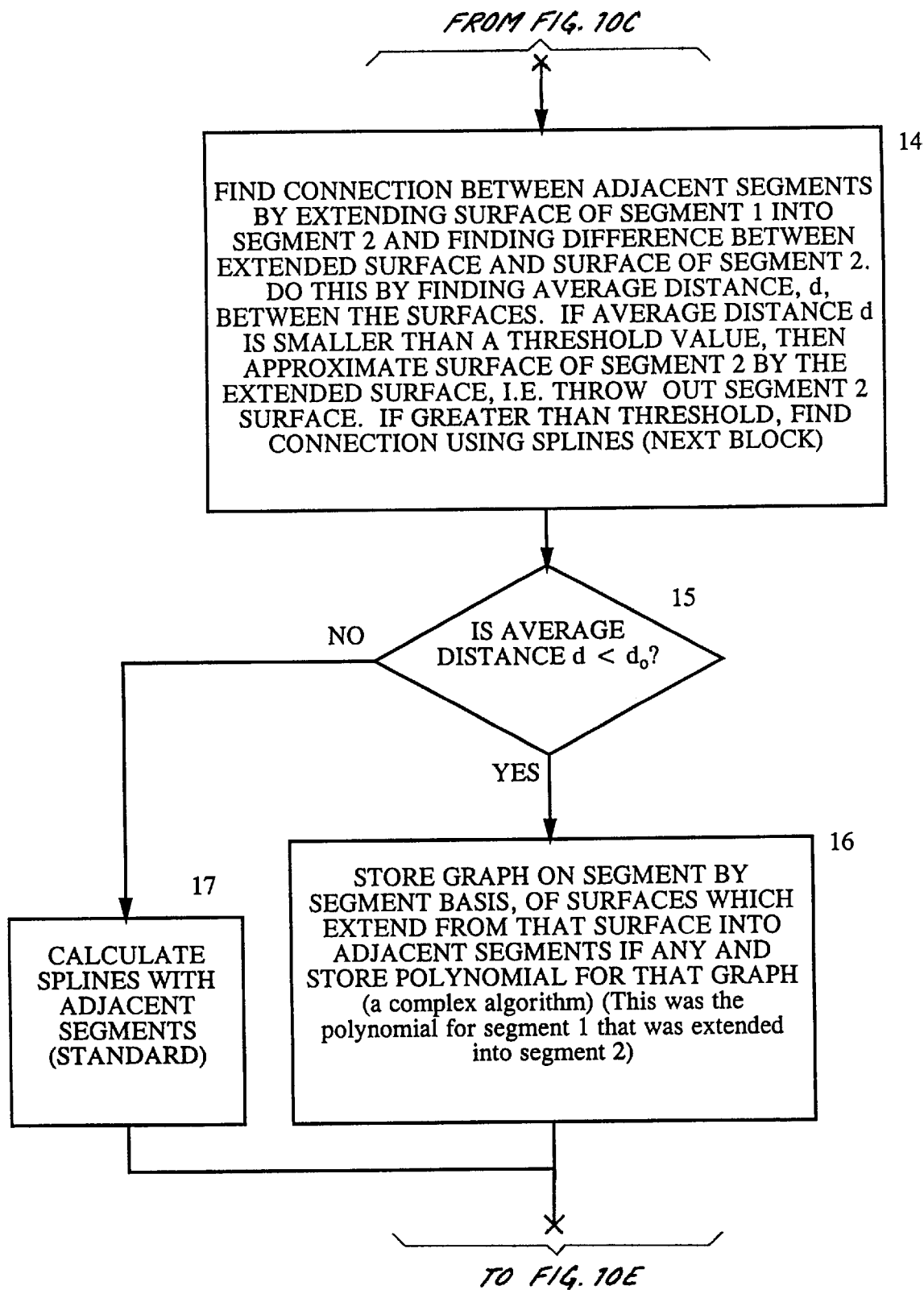
Figure 10E:
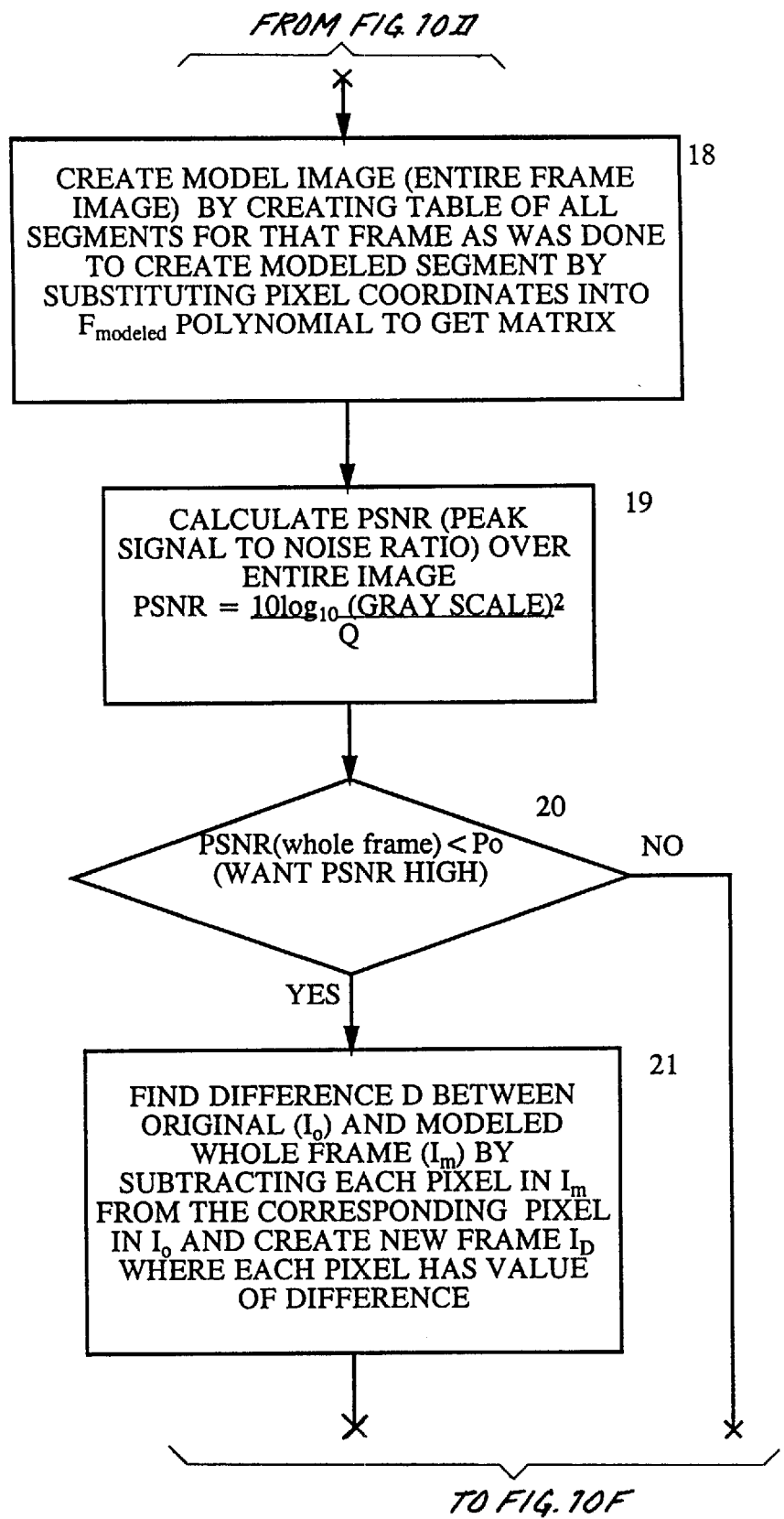
Figure 10F:
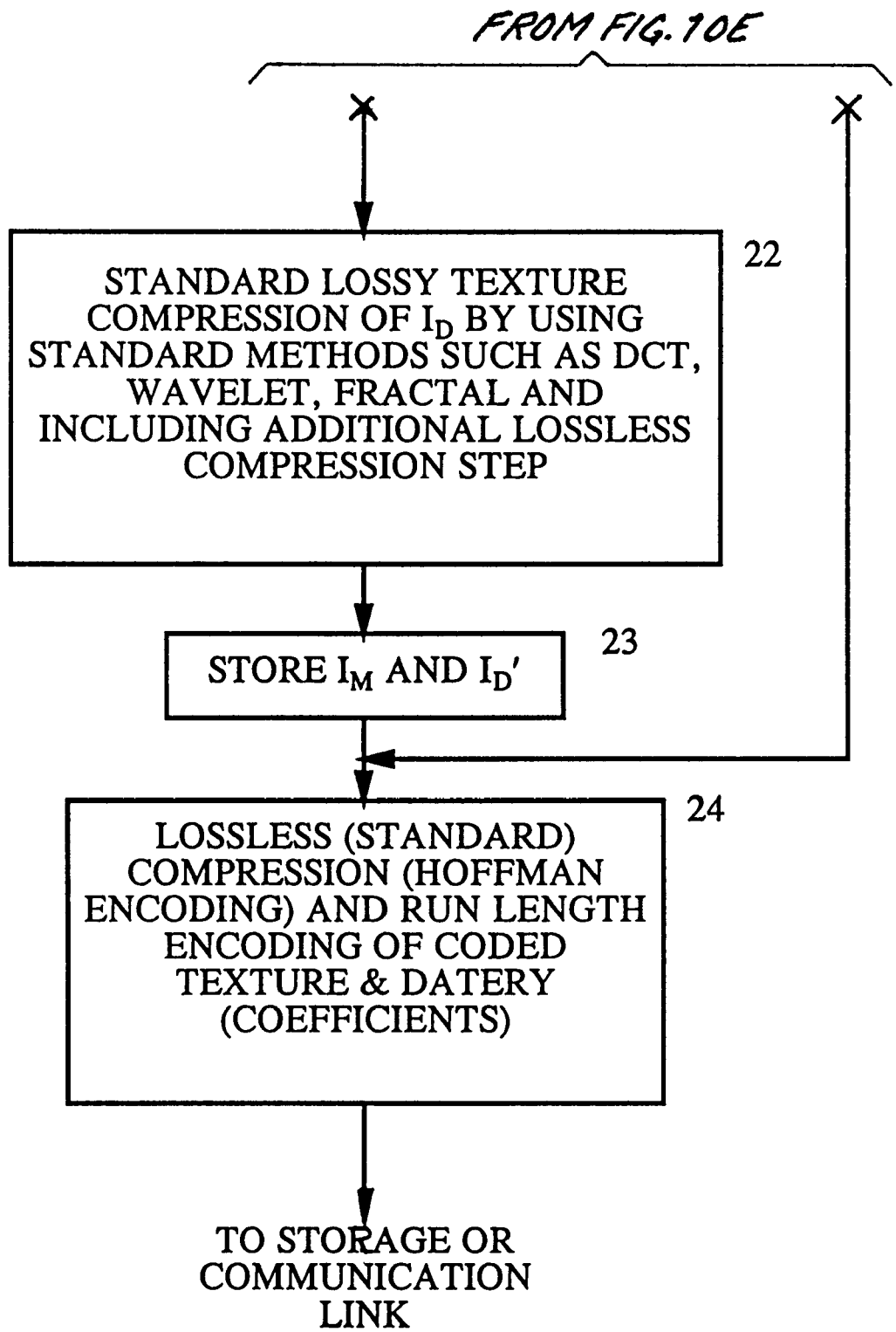

The following is an abbreviated description of the still image compression method as in the flow chart of FIG. 9. Step 1 involves segmenting the original image into blocks of pixels, for example 16×16. Step 2 is to create a model surface for each segment or block corresponding to the original image so that there is isomorphism between the original image and the polynomial surface in accordance with Arnold's Theorem. More particularly this may involve calculating the equation $F_{modelled}$ for each block or segment by substituting for variables in canonical polynomials. (See Steps 3–7 of detailed flow chart which follows). This step inherently eliminates texture of the image and emphasizes the "sculpture" characteristics. Step 3 is to optimize each model segment. This is done by calculating the difference between the original and model segments and choosing coefficients for the canonical polynomial which have the lowest Q i.e., the smallest amount of difference between the original segment and the modelled segment. This is repeated on a segment by segment basis. (See Steps 8–12 of the detailed flow chart which follows). Step 4 is to find connections between adjacent segments to create an entire image i.e., a model image of the entire frame. (See Steps 14–18 of the detailed flow chart). This yields an entire image that has only the "sculpture" characteristics of the original image and eliminates texture. Step 5 is to calculate the peak signal to nose ratio PSNR over the entire image and where the PSNR of the entire image is less than a threshold, the difference between the original image and the modelled image is calculated. This step recreates the texture information of the original image that was lost during the process. Thus, after this step there are two sets of data: the "sculpture" characteristics represented by a few discrete numbers or "datery" and the texture information of the image. (See Steps 19–21) Step 6 is to use standard lossy compression on the texture portion of the data and then to combine the texture and datery and apply standard lossless compression to that combined data. (See Steps 22–24 of the detailed flow chart).

Now the preferred still image encoding method will be described in detail in relation to the detailed flow chart.

In the following description of the still image encoding process according to the present invention the following definitions are used:

$I_o$=original I frame
$I_m$=modeled I frame
$I_d$=difference I frame ($I_d=I_o-I_m$ for each frame)
$i_o$=segment or block of original frame
$i_m$=segment or block of modeled frame
$i_d$=segment or block of difference frame ($i_d=i_o-i_m$ for each block)

Referring now to FIG. 10, this figure sets forth a flow chart of the still image encoding process according to the present invention. In step 1, the next still image or $I_o$ frame is captured. If only still images are being compressed for still image purposes, this image will represent one of those still images. If video is being compressed, the still image to be compressed here is one of the video's I frames which will be compressed in accordance with this method and then inserted at the appropriate location into the video bitstream.

Figure 11A:
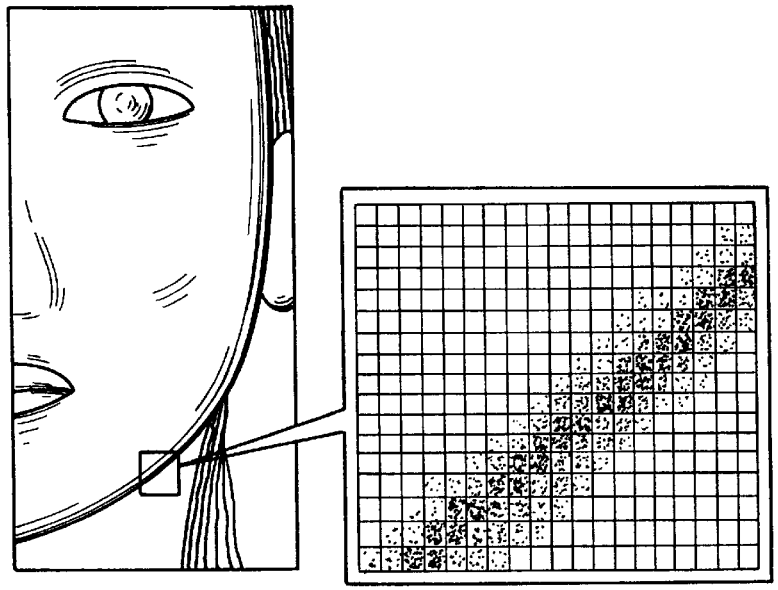
FIG. 11A illustrates an original image with an enlarged edge contour.
Figure 11B:
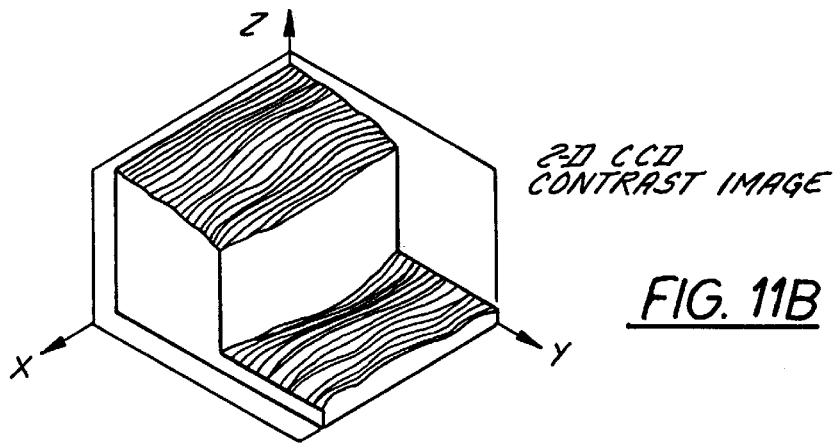
FIG. 11B shows a 2-D CCD image of the enlarged edge contour.

In step 2, the original image $I_o$ is segmented into blocks of pixels of any desired size such as, for example, 16×16 square blocks. The original image is seen in FIG. 11A. Any segment size may be used as desired. These segments or blocks of pixels are designated $i_o$. This segmentation is done according to standard segmentation methods. As an example, the total number of segments or blocks for a 512×512 image is 512×512/(16×16)=1024 different noninterleaving 16×16 segments or blocks.

Step 3 is the first step involving segment by segment operation on each $i_o$ using matrix representation of each segment. In step 3, the Dynamic Range (R) of each segment or block is calculated using the following equation:

$$R = max(i_o) - min(i_o)$$

In the above formula, the pixel having the maximum intensity is subtracted from the pixel having the minimum intensity in the segment. This difference is the Dynamic Range R.

Step 4 compares the Dynamic Range R to $R_o$ which is a threshold determined from trial and error. The threshold $R_o$ is chosen so as to eliminate unnecessary compression such as compression of background scenes. In this regard, if the value R is very small and less than $R_o$, the image is most likely background and the compression technique of the present invention is not needed. In this case, the process is started over again between steps 2 and 3 and another segment or block is operated on. If R is greater than or equal to $R_o$ then the subsequent steps involved in choosing a canonical polynomial from the table and creating a model polynomial by solving its coefficients are then performed. This set of steps now generally described involves choosing the polynomial from the table which best matches each particular segment or block.

Turning now to step 5, a first canonical polynomial from the table is taken. In step 6, substitutions for variables in the canonical polynomials are found. It is possible to apply (1) a nonhomogeneous linear transformation (shift of coordinates), (2) a homogeneous linear transformation (rotation of axis) or (3) a nonhomogeneous nonlinear transformation. For example, if the canonical polynomial $$f_{canonical} = x_1^3 + x_1 x_2$$

is taken from the table, variables $x_1$ and $x_2$ are substituted for as follows using the third example above nonhomogeneous nonlinear transformation:

$$x_1 = (y_1 + a_1 y_1^2 + \ldots a_n y_n^2); \quad x_2 = (y_2 + b_1 y_2^2 + \ldots b_n y_n^2).$$

From this substitution a function describing a "modeled" surface (as opposed to the original image surface) is generated as follows:

$$f_{model} = (y_1^2 + a^2 y_1^4 + 2a y_1^3)(y_1 + a y_1^2) + y_1 y_2 + a b y_1 y_2^2 + a y_1 y_2 + b y_1 y_2^2$$

$$= y_1^3 + a^2 y_1^5 + 2a y_1^4 + a y_1^4 + a^3 y_1^6 + 2a^2 y_1^5 + y_1 y_2 + a b y_1 y_2^2 + a y_1 y_2 + b y_1 y_2^2$$

$$= (y_1 + a y_1^2)^3 + (y_1 + a y_1)(y_2 + b y_2^2)$$

Figure 11C:
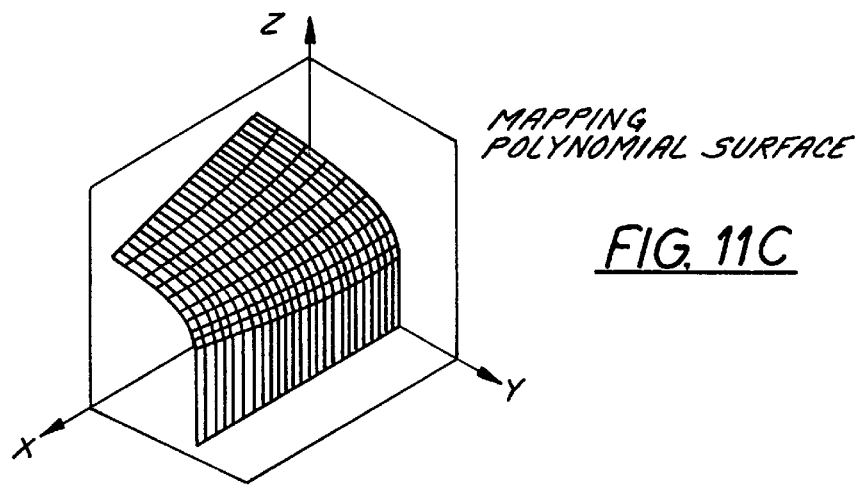
FIG. 11C illustrates a model surface of the original edge contour in accordance with the present invention.
Figure 12:
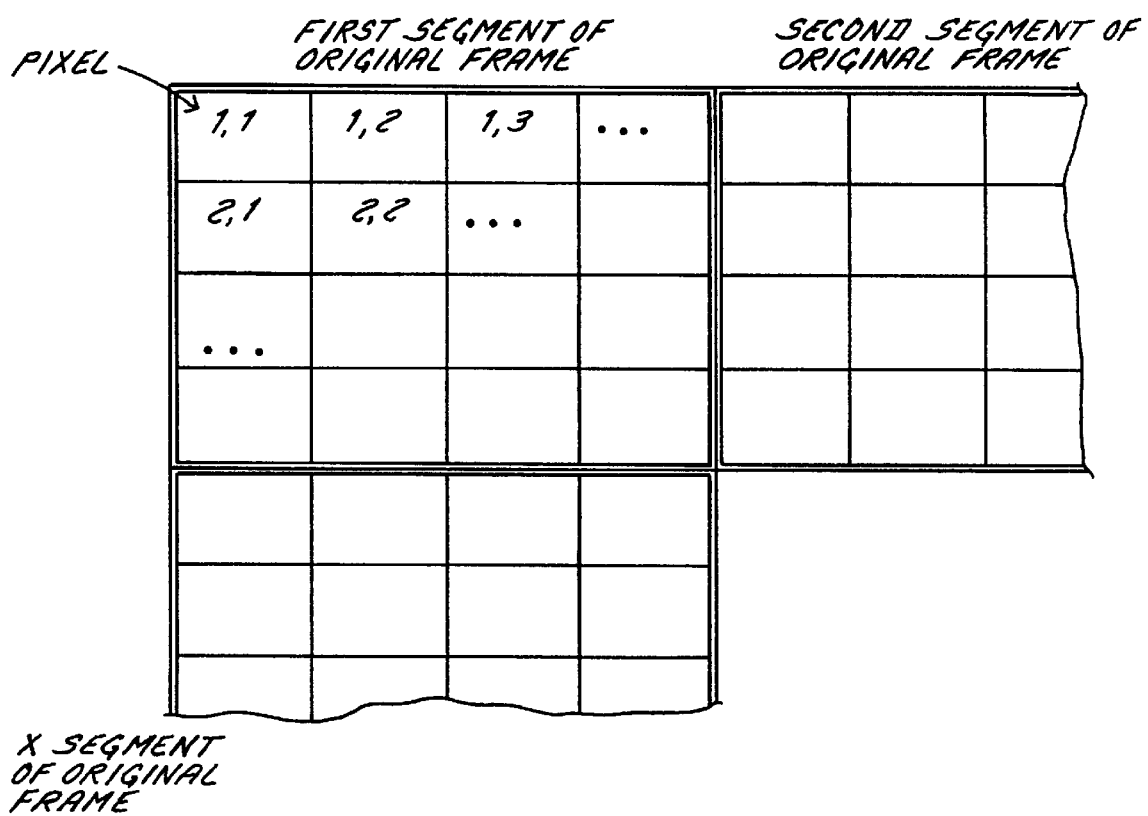
FIG. 12 is an illustration of a segment of an original frame in accordance with the present invention.

At step 7, the modeled surface is created by substituting the coordinates of each pixel in the original segment or block into the equation $f_{model}$. A modelled surface is seen in FIG. 11C. This creates a matrix containing the values $f_{m(1,1)}$, $f_{m(1,2)}$ ... as seen in FIG. 12. Specifically, this matrix is created by substituting the coordinate of the pixel 1,1 from the original segment into the equation $f_{model}$ to generate the element $f_{m(1,1)}$ in the modeled matrix. Next, the coordinate of the pixel 1,2 from the original segment is substituted into the equation $f_{model}$ to generate value $f_{m(1,2)}$ which goes in the 1,2 pixel location of the modeled surface. This is done for each pixel position of the original segment to create a corresponding modeled matrix using the equation $f_{model}$.

At step 8, Q is calculated by determining the difference between the original and modeled segments, pixel by pixel, using the equation:

$$Q = \sqrt{\frac{1}{MN} \sum_{x=0}^{M-1} \sum_{y=0}^{N-1} (i_o(x,y) - i_m(x,y))^2}$$

In other words, Q is calculated by subtracting corresponding pixels from the $i_o$ segment (the original segment) from the $i_m$ (the modeled segment) and squaring this subtraction and summing up all these squares.

At step 9, Q is compared to a predetermined threshold $Q_0$ based on image quality desired. Q should be less than $Q_0$ because the point of the step 8 is to minimize the sum of the differences between the analogous pixels in the original and modeled frames so as to generate a modeled surface that is as close as possible to the original surface. If Q is greater than $Q_0$, the procedure loops back up to step 6 where new coefficients are tried in the same polynomial. Then steps 7, 8, and 9 are repeated, and if Q is less than $Q_0$ with that new set of coefficients, then the process continues into step 10 where that Q and the coefficients that produced the lowest Q for that polynomial are stored. After storage at step 10, the process loops back up to step 5 if all polynomials have not yet been tested where the next canonical polynomial from the library is chosen and tested and solved for coefficients which produce the lowest Q for that next polynomial. Hence, steps 6, 7, 8, and 9 are repeated for that next polynomial until coefficients are found which produce the lowest Q for that polynomial. At step 10, the Q and the coefficients for that next polynomial are stored. This process of steps 5, 6, 7, 8, 9, and 10 is repeated for each polynomial in the library. After each polynomial in the library is tested for the segment under test, the process moves to step 11.

At step 11, the polynomial having the lowest Q of the polynomials tested for that segment is chosen. That polynomial is transferred to step 12.

At step 12, all coefficients for the chosen polynomial (the one having the lowest Q of all the polynomials tested for that segment) are stored. These coefficients are coefficients of the equation $f_{model}$ which describes the modeled surface.

After step 12, the next set of operations involves segment by segment operation working only with the polynomials and their coefficients whereas the above steps 5–12 worked with the matrix representation of each segment. Because only the polynomials and their coefficients are worked with in the next set of operations, a significant amount of compression has taken place because the data representing the surface is far less voluminous than when a matrix representation of the segments is worked with. The data is simply coefficients of polynomials which can be called "datery".

At step 13, the current segment is taken or captured from the above steps. At step 14, a connection is found between adjacent or neighboring segments by extending the surface of a first segment into a second segment and finding differences between the extended surface and the second segment surface. Specifically, this is done by finding the average distance "q" between the surface which extends from the first segment into the second segment and the surface of the second segment using standard methods. If the average distance "q" is smaller than a threshold value $q_o$, the surface of the second segment is approximated by the extended surface. In other words, if the distance q is smaller than the threshold value $q_0$, the second segment surface is thrown out because it can be approximated satisfactorily by substituting the extended surface in its place. If the average distance q is greater than the threshold value $q_0$, a connection needs to be found between the extended surface and the surface of the second segment.

Figure 13A:
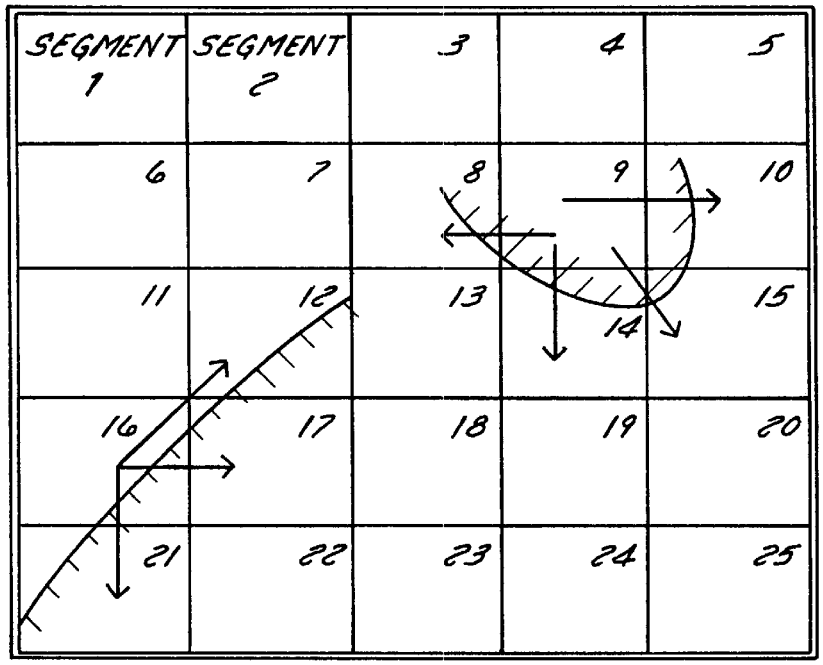
FIGS. 13A–13C is an illustration of connecting segments of a frame in accordance with the present invention.
Figure 13B:
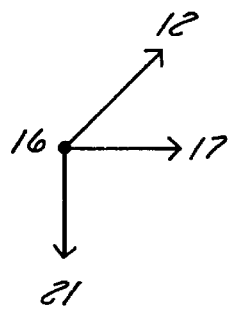
Figure 13C:
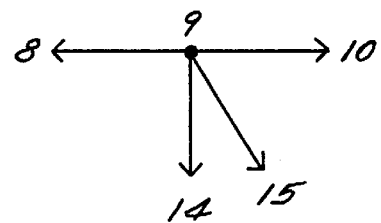

Thus, at step 15, the average distance q is checked to determine whether it is less than the threshold value $q_0$. If it is, then the connections between the adjacent or neighboring segments which can be plotted as a graph, as seen in FIG. 13, are stored on a segment by segment basis. In other words, as seen in FIG. 13, the surfaces which extend from, say, a surface in segment "9" into adjacent or neighboring segments (8, 10, 14 and 15), if any, are stored in the polynomial for segment 9 (earlier calculated and then stored at step 12) which then represents that graph of connections between segment 9 and segment 8, 10, 14 and 15. In other words, the polynomial that was calculated and stored for the segment in question, here segment 9, is modified so that it now extends into adjacent segments 8, 10, 14, and 15 and represents the surfaces in those segments. The polynomials for segments 8, 9, 10, 14 will be substituted with the new bigger scale polynomial obtained from 9.

If the average distance from 9 was not less than $q_0$ (which indicates that the surface extended from the segment in question, segment 9 for example, into an adjacent segment, 8, 10, 14, or 15 for example, did not satisfactorily approximate the surface of the second segment), then a spline must be calculated at step 17.

At step 17 splines are calculated from the segment with adjacent segments using standard spline equations which need not be detailed here.

After both steps 16 and 17, the process continues at step 18. At step 18, a model image $i_m$ is created of the entire frame by creating a table of all segments for that frame using the information calculated for each segment in the above steps. The creation of this table representing the entire frame from its numerous segments is analogous to step 7 where a modeled segment was created by substituting the pixel coordinates from the original segment into the $f_{model}$ polynomial to get a matrix describing the modeled surface. At step 18, however, instead of creating a modeled segment of pixels, a modeled frame is created from modeled segments. Thus, it can be seen that the smaller parts calculated above are now being combined to generate an entire modeled frame.

After step 19, the peak signal to noise ratio (PSNR) is calculated over the entire image using the equation:

$$PSNR = \frac{10 \log_{10}(\text{number of gray scale levels})^2}{Q}$$

$$Q = \sqrt{\frac{1}{hv} \sum_{x=0}^{M-1} \sum_{y=0}^{N-1} [I_o(x, y) - I_m(x, y)]^2}$$

h and v are number of pixels in horizontal and vertical directions respectively for the entire frame image. The Q values for each of the segments were stored at step 10 above and may be retrieved for this purpose.

At step 20, the PSNR of the entire frame is compared to a threshold $P_0$. If PSNR is less than $P_0$, then no further processing according to the present invention need be accomplished and processing can continue at step 24 where a standard lossless compression such as Hoffman encoding and run-length encoding are used to further compress the frame data. The compressed data is then sent to storage or a communication link.

If PSNR is greater than $P_0$ at step 20, then processing continues at step 21. At step 21, the difference between the original frame $I_o$ and the modeled frame $I_m$ is found by subtracting each pixel in $I_m$ (which was created at step 18) from the corresponding pixels in $I_o$ and a new frame $I_d$ is created (see FIG. 14) where each pixel in that frame has as its value the difference between the corresponding pixels in the frame $I_o$ and the frame $I_m$. The frame $I_d$ therefore corresponds to the high frequency components, such as edge information which typically is lost in conventional compression techniques. This "texture" information containing high frequency components and edge information is then compressed separately at step 22.

At step 22, standard lossy texture compression of the newly created frame $I_d$ is performed by using standard methods such as DCT, wavelet, and fractal methods. At step 22, standard additional lossless compression is also performed. The output of step 22 is $I_d'$ which then is fed into step 23. At step 23, the $I_m$ frame is stored and the $I_d'$ frame is stored. This concludes the compression of the still frame or $I_o$ frame.

As can be seen, the polynomial surface image is highly compressed because it is stored and transmitted as a complex algorithm (polynomial) rather than as a matrix representation. Additionally, the edge contour image $I_d$ is separated from the polynomial surface, as a by-product of characterizing the original image by a canonical polynomial and contains the high frequency and edge components and is itself compressed.

Preferred Still Image Decoding Method

Figure 15A:
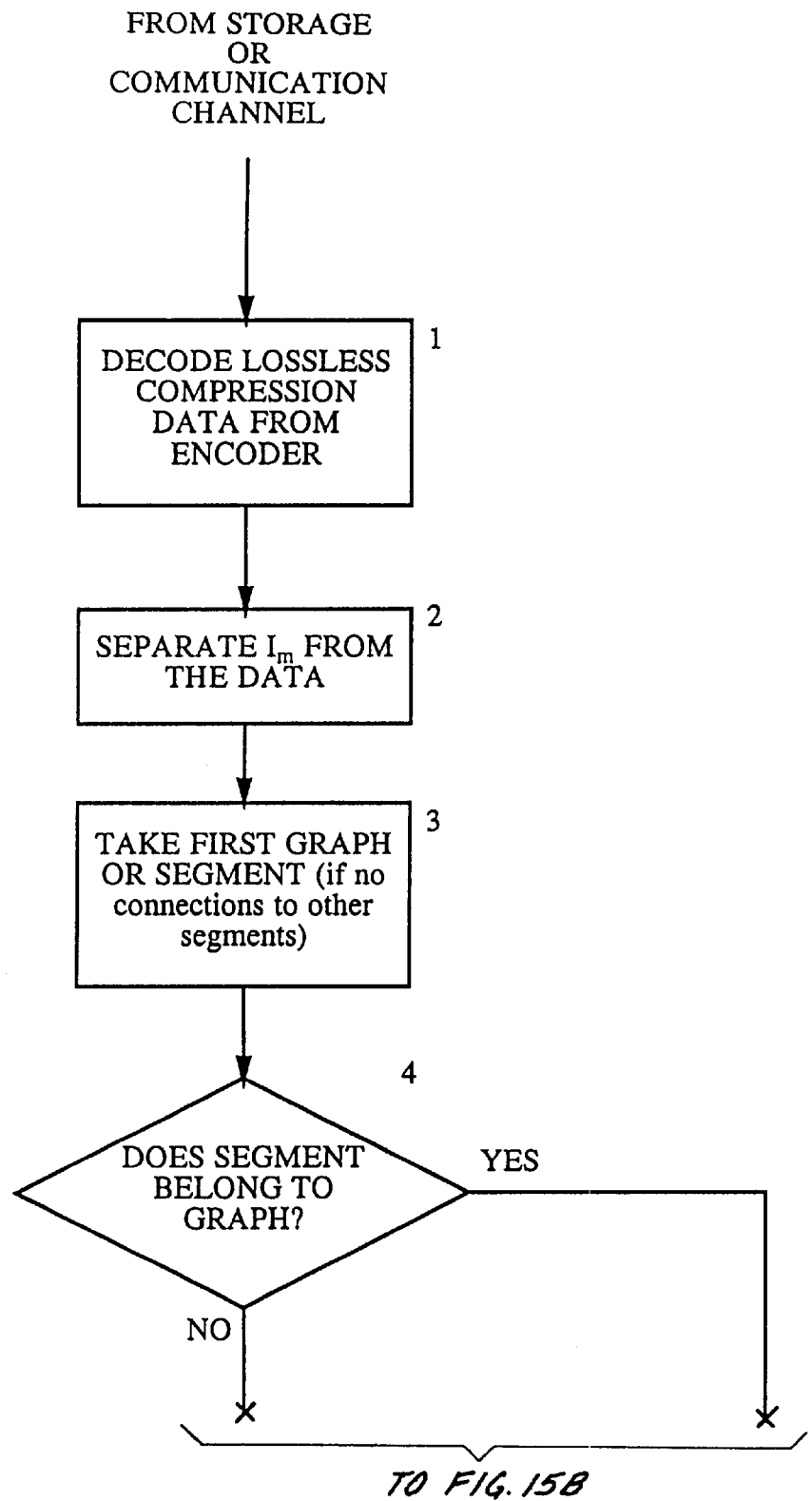
FIG. 15 is a flow chart of the decoding process for ISMP compression in accordance with the present invention.
Figure 15B:
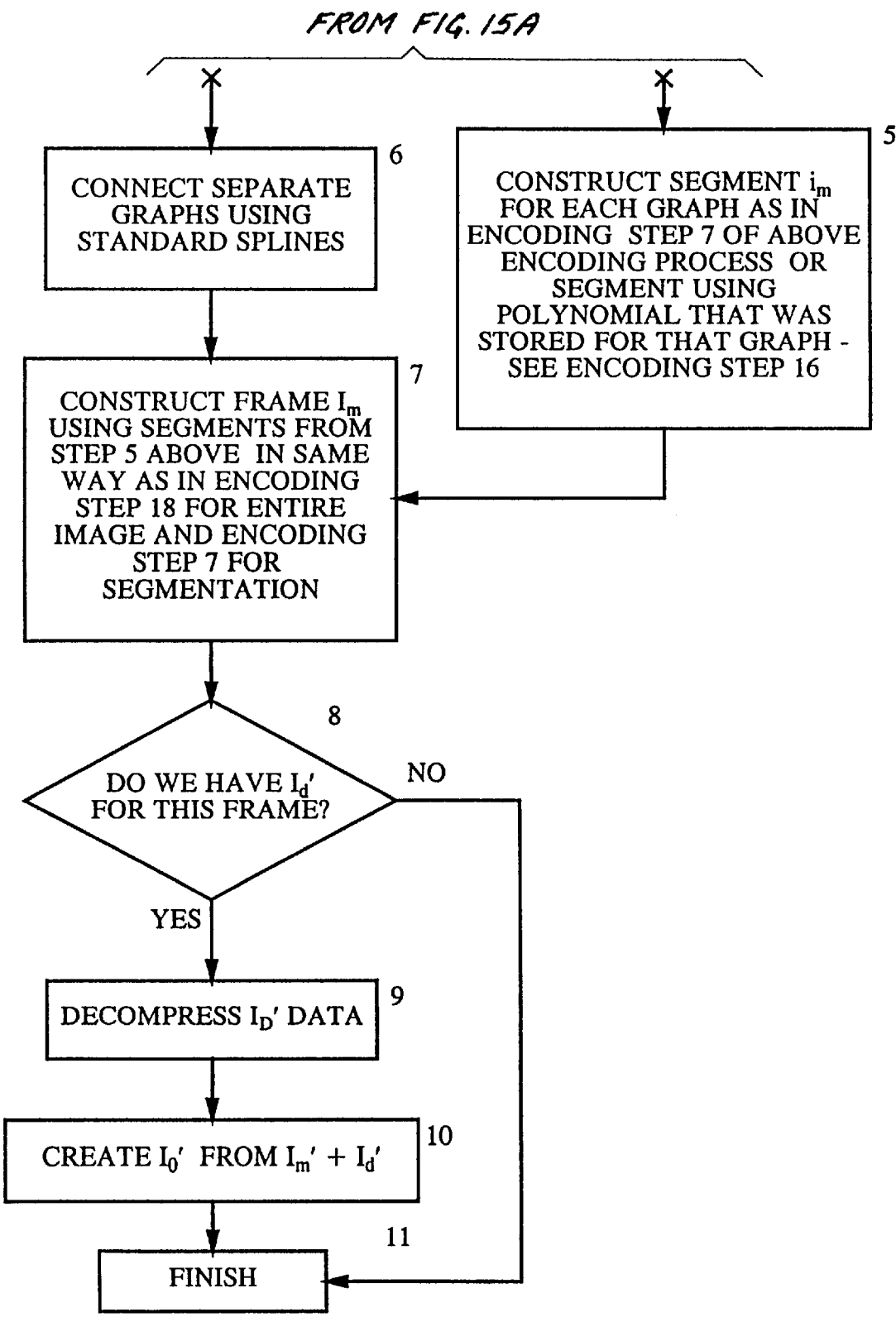

The still image decoding process will now be described as seen in the flow chart of FIG. 15. The input to the still image decoding process will be either just the whole frame $I_m$ in the case where the PSNR of the whole frame at step 20 was not less than threshold $P_o$ or the whole frame $I_m$ plus $I_d'$ where the PSNR of the whole frame at step 20 was less than $P_o$ and the differences between the original $I_o$ frame and the modeled frame $I_m$ were calculated to create new frame $I_d$ holding the textured or high frequency and edge information.

In either case, the first step in decoding is step 1 which decodes the lossless compression data from the encoder which was compressed at step 24. At step 2 of the decoding process, frame $I_m$ is separated from the other data in the bitstream. At step 3, the first graph or segment which was stored at step 16 on a segment by segment basis is taken.

At step 4, whether the segment belongs to a graph (i.e., has connections to adjacent segments) or is an isolated segment (i.e., has no connections to neighboring segments) is tested. If the segment does belong to a graph, then at step 5, a segment $i_m$ is constructed for each graph (analogous to the creation of the modeled matrix surface in step 7 of the encoding process) using the polynomial that was stored for that graph at step 16 of the encoding process.

If the segment does not belong to a graph, then after step 4 the process skips step 5 and continues with step 6.

At step 6, the separate graphs using standard splines are connected. In other words, those segments from steps 14, 15, and 17 which were connected by splines will be reconnected here. (Recall that it was these segments for which the extended surface of another adjacent segment did not satisfactorily characterize the surface of these segments and therefore a spline equation had to be used.)

From step 5 where a segment $i_m$ for each graph was reconstructed, and from step 6 where separate graphs were connected using standard splines, the process continues at step 7.

At step 7, the frame $I_m$ is constructed using segments from step 5 (in the same way as the frame $I_m$ was constructed in the encoding process at step 18 and also similar to how an individual segment or modeled surface or modeled segment was created at step 7 in the encoding process.)

At step 8, the presence of a $I_d'$ frame for or in conjunction with the frame $I_m$ is tested. If there is no frame $I_d'$, then the process is finished and the still image is fully decoded for that frame. If on the other hand there is a frame $I_d'$ in conjunction with the frame $i_m$, then the process continues to step 9.

At step 9, the frame $I_d'$ is decompressed.

At step 10, frame $I_o'$ is created from the combination of frame $I_m$ from step 7 of the decoding process and frame $I_d'$ from step 9 of the decoding process. After the frame $I_o'$ is created, the process is finished and the still image is fully decoded.

Preferred Video Compression Method—Motion Estimation

The inventive compression technique for still images can be incorporated into standard MPEG compression to enhance video compression through spatial hypercompression of each I frame inserted into the video bitstream. Alternatively, in the preferred embodiment, a novel motion estimation technique is employed which provides significantly greater compression due to temporal compression. According to the present invention, I frames are inserted according to video content. This is done by accumulating the error or difference between all corresponding microblocks or segments of the current frame and the predicted frame and comparing that accumulated error or difference to a threshold to determine whether the next subsequent frame sent should be an I frame. If the error or difference is large (i.e., when motion error is high), the I frame is sent. If the error or difference is small, the I frame is not sent and the frame sequence is unaltered. As a consequence, full synchronization of I frame insertion with changes in scene is achieved and bandwidth is significantly reduced because I frames are inserted only where necessary, i.e., where content requires them. Thus, the present invention, for the first time, analyzes the errors between the I frame and the B and P frames into which it will be inserted to decide whether to insert the I frame at that point or not. Consequently, the present invention significantly increases the overall image compression ratio, while offering a simultaneous benefit of increased image quality. In addition, by using the technique of the present invention for video compression, the distances between I frames are enlarged, which leads to better motion estimation and prediction.

The video compression technique of the present invention may be used with both I frames compressed using the still ISMP compression encoding process of the present invention or standard I frame compression techniques. The most significant compression will occur if both the ISMP compression encoding process of the present invention and the motion estimation process of the present invention are used. It is worth noting that in existing systems, a reasonable quality video can be produced only if I frame compression is not higher than 20:1 to 40:1. With the present invention I frame compression of 300:1 is achieved. The following table illustrates the improvement over standard compression of the inventive technique of fixed separation of I frames compressed with the inventive CT algorithm used in conjunction with the inventive variable separation of I frames compressed with the CT algorithm.

|  | Standard Compression | Fixed separation with I frames compressed with CT algorithm | Variable separation of I frames compressed with CT algorithm |
| --- | --- | --- | --- |
| Image Resolution (8-bit per pixel) | 352 × 240 | 352 × 240 | 352 × 240 |
| Uncompressed Image Size per Frame | 84,480 | 84,480 | 84,480 |
| I Frame Compression | 30:1 | 300:1 | 100:1 |
| Compressed Image Size per Frame | 2816 | 250 | 860 |
| I Frame Separation | 15 frames | 15 frames | 45 frames |

-continued

|  | Standard Compression | Fixed separation with I frames compressed with CT algorithm | Variable separation of I frames compressed with CT algorithm |
| --- | --- | --- | --- |
| ration | (0.5 second) | (0.5 second) | (1.5 second) |
| Average Size of BP Frame (200:1) | 422 | 422 | 422 |
| Uncompressed Data Size for 1 min. Video | 84,480*30 freq*60 sec = 1,520,064,000 | 1,520,064,000 | 1,520,064,000 |
| Overall Compressed Data Size for 1 min. Video | 10,483,000 | 1,900,080 | 1,520,000 |
| Corresponding Compression Ratio | 145:1 | 800:1 | 1000:1 |

Motion estimation is important to compression because many frames in full motion video are temporally correlated, e.g., a moving object on a solid background such as an image of a moving car will have high similarity from frame to frame. Efficient compression can be achieved if each component or block of the current frame to be encoded is represented by its difference with the most similar component, called the predictor, in the previous frame and by a vector expressing the relative position of the two blocks from the current frame to the predicted frame. The original block can be reconstructed from the difference, the motion vector, and the previous frame. The frame to be compensated can be partitioned into microblocks which are processed individually. In a current frame, microblocks of pixels, for example 8×8, are selected and the search for the closest match in the previous frame is performed. As a criterion of the best match, the mean absolute error is the most often used because of the good trade off between complexity and efficiency. The search for a match in the previous frame is performed in a, for example, 16×16 pixels window for an 8×8 reference or microblock. A total of, for example, 81 candidate blocks may be compared for the closest match. Larger search windows are possible using larger blocks 8×32 or 16×16 where the search window is 15 pixels larger in each direction leading to 256 candidate blocks and as many motion vectors to be compared for the closest match.

Once the third subsequent frame is predicted, the standard methods provide that the error between a microblock in the current frame and the corresponding microblock in the predicted frame are compared and the error or difference between them is determined. This is done on a microblock by microblock basis until all microblocks in the current frame are compared to all the microblocks in the predicted frame. In the standard process these differences are sent to the decoder real time to be used by the decoder to reconstruct the original block from the difference, the motion vector, and the previous frame. The error information is not used in any other way.

In contrast, in the present invention, the error or difference calculated between microblocks in the current frame and the predicted frame are accumulated or stored and each time an error is calculated between a microblock in the current frame and the corresponding microblock in the predicted frame that error is accumulated to the existing error for that frame. Once all the errors for all the blocks in the current frame as compared to the predicted frame are generated and summed, that accumulated error is then used to determine whether a new I frame should be inserted. This methodology is MPEG compatible and yields extremely high quality video images not possible with state of the art motion estimators. The accumulated error is used to advantage by comparing it to a threshold $E_0$ which is preset depending upon the content or type of the video such as action, documentary, or nature. If $E_0$ for a particular current frame is exceeded by the accumulated error, this means that there is a significant change in the scene which warrants sending an entire new I frame. Consequently, an entire new I frame is compressed and sent, and the motion estimation sequence begins again with that new I frame. If $E_0$ is not exceeded by the accumulated error, then the differences between the current frame and the predicted frame are sent as usual and this process continues until $E_0$ is exceeded and the motion estimation sequence is begun again with the sending of a new I frame.

Figure 16A:
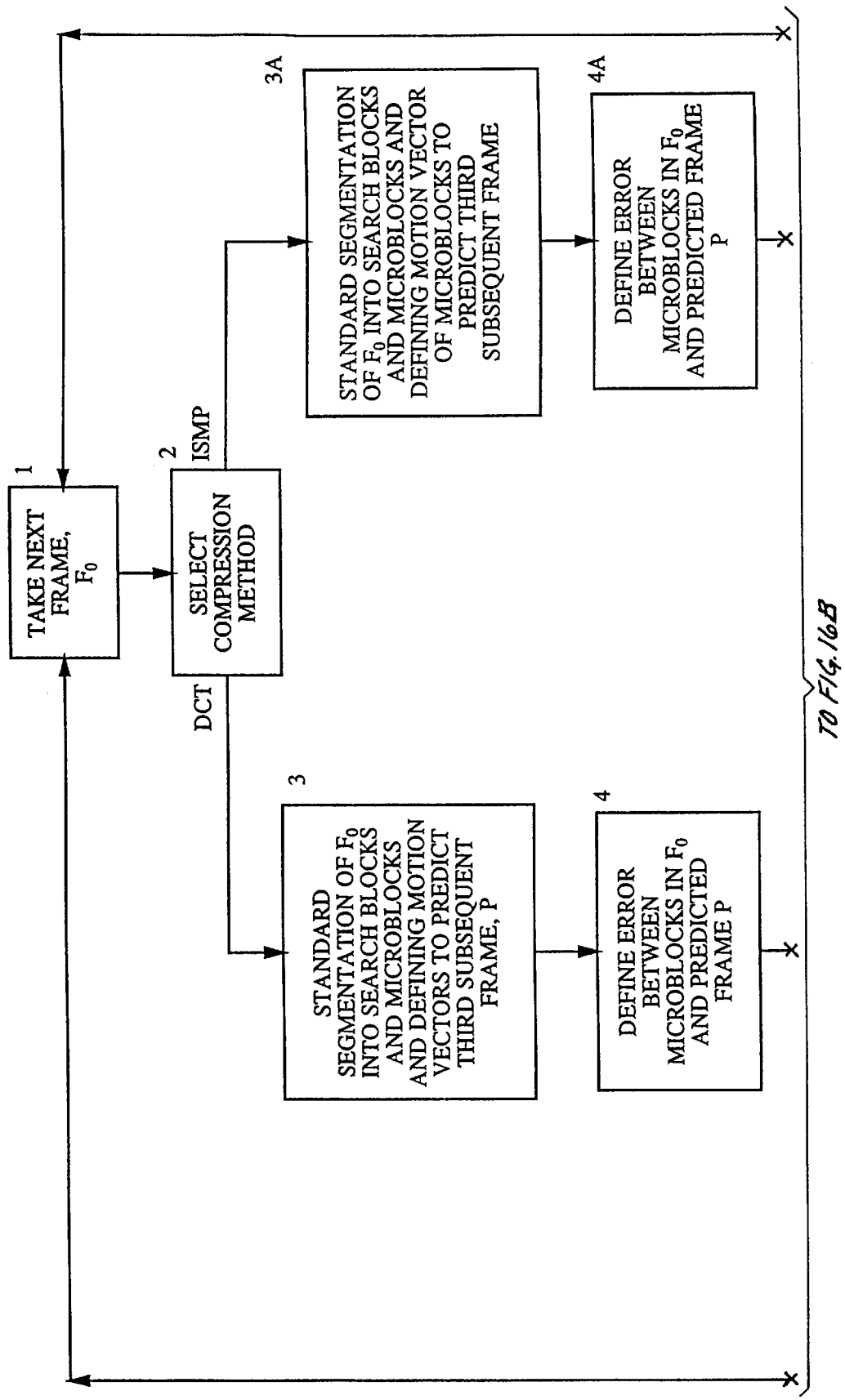
FIG. 16 is a flow chart of the motion estimation process in accordance with the present invention.
Figure 16B:
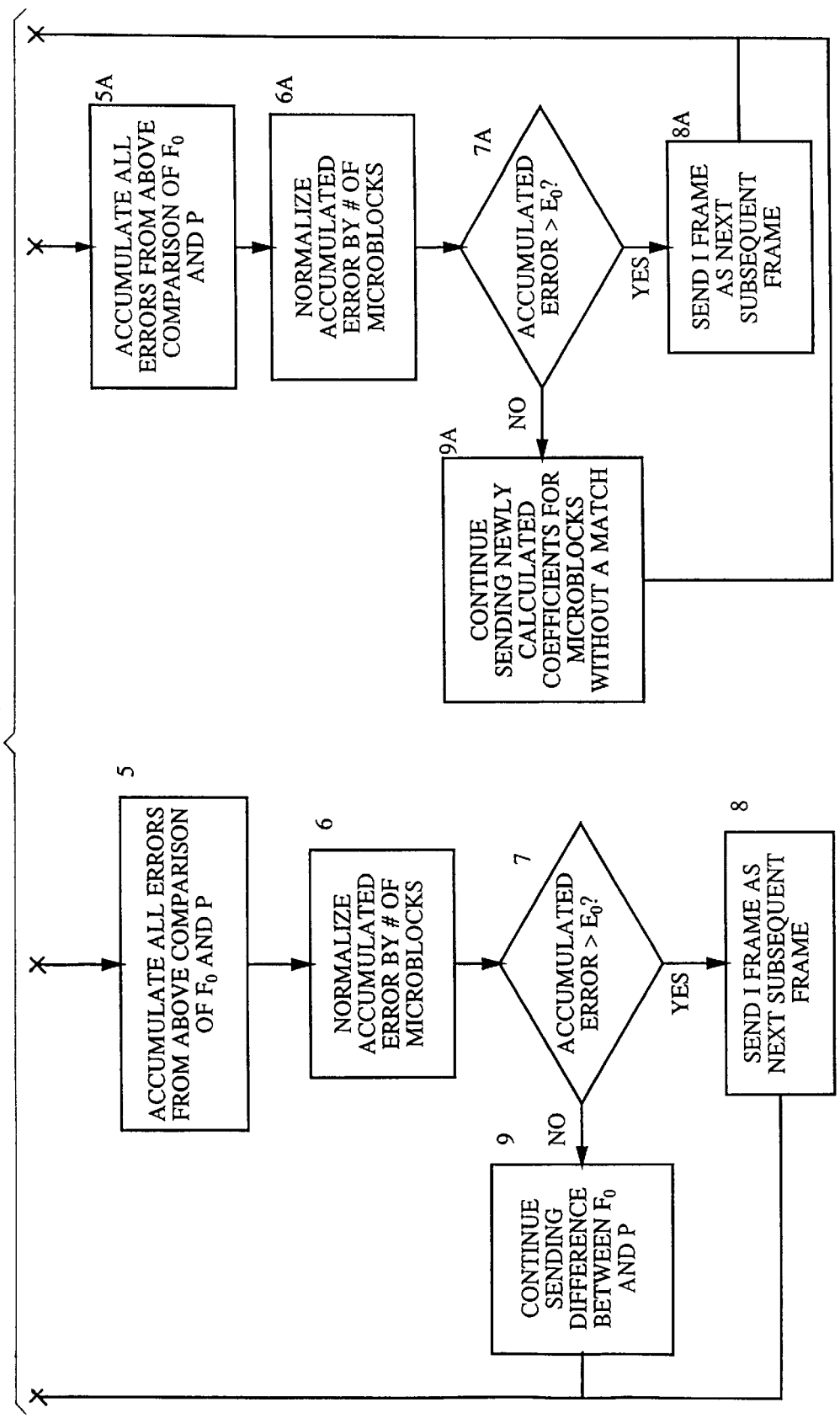

Now turning to FIG. 16, the motion estimation process is now described in detail. At step 1, the next $F_0$ frame is taken. This frame may be the first frame of the video in which case it is an I frame or may be a subsequent frame. At step 2, if $F_0$ was compressed by standard DCT methods, the left branch of the flow chart of FIG. 8 is followed. If $F_0$ was compressed using the inventive ISMP algorithm, the right branch of the flow chart in FIG. 8 is followed.

First, assuming that $F_0$ was compressed using standard DCT methods, step 3 involves standard segmenting of the $F_0$ frame into search blocks having subblocks called microblocks and defining motion vectors which are used to predict the third subsequent frame after $F_0$. This is accomplished using standard techniques well known in the art.

At step 4, the error or difference between each microblock in $F_0$ and the corresponding microblock in the predicted third subsequent frame is defined for all microblocks in $F_0$. At this point the inventive motion estimation process diverges from standard techniques.

If a standard MPEG encoder-decoder scheme was being used, these microblock differences would be sent from the encoder to the decoder and used by the decoder to reconstruct $F_0$. By sending only the differences between $F_0$ and the predicted third subsequent frame, significant compression is realized because it is no longer necessary to send an entire frame of information but only the differences between them. In accordance with standard MPEG encoder-decoder techniques, however, a new I frame is necessarily transmitted every 15 frames whether an I frame is needed or not. This poses two problems. Where the I frame is not needed, bandwidth is wasted because unnecessary bits are sent from the encoder to the decoder (or stored on disc if the process is not done real time). On the other hand, where the content of the video is such that significant scene changes occur from one frame to another much more often than every 15 frames, the insertion of an I frame every 15 frames will be insufficient to ensure a high quality video image at the decoder. For these reasons, the motion estimation technique of the present invention is especially valuable because it will, dependent upon the content of the video, insert or send an I frame to the decoder when the content of the video warrants it. In this way, a high quality image is maintained.

This is accomplished in the present invention by, as seen at step 5, accumulating the error between corresponding microblocks in the $F_0$ and the predicted third subsequent frame as each error is defined in step 4 for each microblock of $F_0$.

The next step, step 6, is optional and involves normalizing the total accumulated error for $F_0$ by defining an average error A which is the total accumulated error divided by the number of microblocks in $F_0$. This yields a smaller dynamic range for the errors, i.e., smaller numbers may represent the errors.

Continuing with step 7, the accumulated error (whether normalized or not) is compared to a threshold error $E_0$. $E_0$ is chosen based upon video content such as whether the video is an action film, a documentary, a nature film, or other. Action videos tend to require insertion of I frames more often because there are more drastic changes in scene from one frame to another. It is especially important when compressing such videos to use the motion estimation technique of the present invention which can insert additional I frames based on video content where necessary to keep video image quality high. In choosing $E_0$, bandwidth versus quality should be considered. If $E_0$ is set high, a high level of errors will be tolerated and fewer I frames will need to be inserted. Quality, however, will decrease because there will be an under utilization of bandwidth. If, on the other hand, $E_0$ is set too low, I frames will be inserted more frequently and available bandwidth may be exceeded and frames may start to drop out as commonly happens with MPEG. So the threshold $E_0$ should be tuned to video content. This can be done in real time by analyzing the video off-line and varying $E_0$ in accordance with the statistics of the video, such as the number of cuts, the amount of action, etc. This process may be enhanced by using genetic algorithms and fuzzy logic. Where the accumulated error is greater than $E_0$, the next frame sent will be an I frame. In accordance with standard techniques, it is preferable that the I frame be compressed prior to sending it to the decoder. This reinitiates the sequence of frames at step 8.

If the accumulated error is less than $E_0$, the subsequent frame is not sent as an I frame but the differences are continued to be sent at step 9 to minimize bandwidth of the signal, sent between the encoder and decoder. The process then reinitiates at step 1 where the next frame $F_1$ is taken. That next frame may not be an I frame but may instead be a subsequent frame, and the methodology is the same in either case. The next frame, whether it is an I, B, or P frame, is compared to the predicted third subsequent frame and the method continues as described above.

In an alternative embodiment, instead of sending the I frame as the next subsequent frame, the I frame could be sent as the current frame and used to replace error data for each microblock data for each microblock stored in the decoder buffers. This could be accomplished by clearing the buffers in the decoder holding errors between each of the microblocks $F_0$ and the predicted third subsequent frame and replacing that data with the I frame. Although not compatible with MPEG, it may be advantageous in certain situations to clear out the buffers containing the high error frame data and replace that data with the next frame as an I frame.

The motion estimation technique of the present invention may also be used to dynamically change or update compression ratio on a frame by frame basis by providing feedback from the receiver or decoder and using that feedback to change parameters of the compression engine in the registers of the video compression chips. For example, if the accumulated error calculated in the motion estimation technique of the present invention were too frequent or extraordinarily high, this information could be used to alter the parameters of the compression engine in the video compression chips to decrease the compression ratio and thereby increase bandwidth. Conversely, if the accumulated error over time was found to be unusually low, the compression ratio could be increased and thereby the bandwidth of the signal to be stored could be decreased. This is made possible by the accumulation of errors between the corresponding microblocks of the current frame ($F_0$) and the predicted third subsequent frame. This is not possible in prior art techniques because, although the error between corresponding microblocks of the current frame and the predicted third subsequent frame are calculated, there is no accumulated error calculated and no use of that accumulated error anywhere in the system. In the present invention, however, the accumulated error is calculated and may, in fact, be used on a frame by frame basis to decide whether the next frame should be an entire I frame as opposed to only the difference signal.

In a bandwidth on demand system, for example, if the feedback from the receiver indicates that there is a high bit error rate (BER), the transmitter may lower the bandwidth by increasing the compression ratio. This will necessarily result in a signal having sequences of different bit rates which are not possible in prior art MPEG systems. Intelligent systems such as genetic algorithms or neural networks and fuzzy logic may be used to determine the necessary change in compression ratio and bandwidth off-line by analyzing the video frame by frame.

Turning now to the right branch of FIG. 16, this branch is followed if the still compression method selected was the ISMP algorithm of the present invention which compresses each frame in accordance with catastrophic theory and represents the "structure" of that image in a highly compressible form using only the coefficients of canonical polynomials. Step 3A in the right branch would be to predict the third subsequent frame from the current frame (here $F_0$) using standard techniques of defining the motion vectors of microblocks within the search blocks by template matching.

Step 4A would be to define the error between microblocks in $F_0$ and the microblocks in the predicted third subsequent frame. This is done using standard techniques. If a particular microblock in $F_0$ has a match with a microblock in the predicted frame, i.e., the error is 0, then the coefficients of the polynomial that were generated for that microblock when $F_0$ was compressed using the ISMP algorithm are then sent to the decoder and used along with the motion vectors generated in step 3A to reconstruct $F_0$. The sending of just the coefficients results in much higher than normal compression because the number of bits representing those coefficients is very small. If a microblock in $F_0$ has no match in the predicted third subsequent frame i.e., an error exists between those corresponding microblocks, new coefficients are generated for the corresponding microblock in the predicted third subsequent frame and those coefficients are sent to the decoder and used along with the motion vectors generated in step 3A to reconstruct $F_0$. As an alternative, the newly generated coefficients for the corresponding microblock in the predicted third subsequent frame could be subtracted from the coefficients of the corresponding microblock in $F_0$ to even further compress the data. This may be done but is not necessary because the coefficients representing each microblock constitute highly compressed data already and further compression is not necessary.

At step 5A, the errors from the above comparison of $F_0$ and P are accumulated.

At step 6A, the accumulated errors are normalized by the number of microblocks.

At step 7A, the accumulated error is compared to the threshold $E_0$. And if the accumulated error is greater than the threshold $E_0$ a new I frame is sent as the new subsequent frame at step 8A. If the accumulated error is less than the threshold error $E_0$ the coefficients that were newly generated for a particular microblock that did not find a match are continued to be sent to the decoder at step 9A. After both steps 8A and 9A the process reinitiates at step 1. Thus, according to the present invention, the error data is used and interpreted in a novel way which provides high compression and quality imaging.

Motion Estimation Hardware

Figure 17:
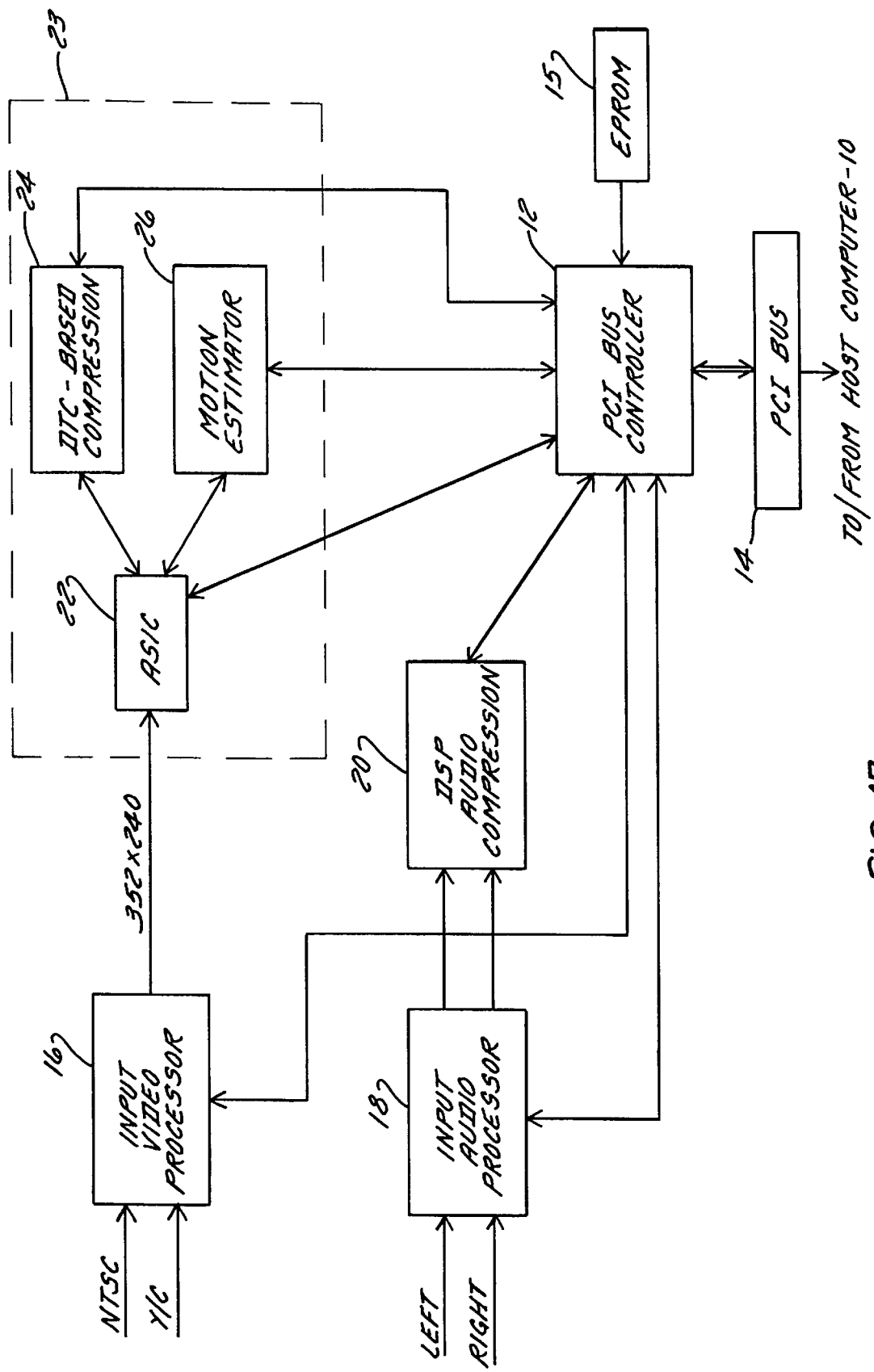
FIG. 17 is a circuit schematic of the hardware used for motion estimation in accordance with the present invention.

Referring now to FIG. 17, the hardware for performing motion estimation is depicted in block diagram format. All of the hardware is standard. A host computer 10 communicates with the video processor board over PCI bus 14. The host computer 10 is preferably of at least the 100 MHz Pentium® class (Pentium® is a registered trademark owned by Intel Corp. of Santa Clara, Calif.). PCI bus controller 12 controls communications over the PCI bus 14. EPROM 15 stores the coefficients and transfers them to the PCI bus controller 12 so that all the internal registers of the PCI bus controller 12 are set upon start-up. Input video processor 16 is a standard input video processor. It is responsible for scaling and dropping pixels from a frame. It has two inputs, a standard composite NTS signal and a high resolution Y/C signal having separated luminance and chromance signals to prevent contamination. The input video processor 16 scales the normal 702×480 resolution of the NTS input to standard MPEG-1 resolution of 352×240. The input video processor 16 also contains an A/D converter (not shown) which converts the input signals from analog to a digital output.

Below input video processor 16 is audio input processor 18 which has as its input left and right stereo signals. The audio input processor 18 performs A/D conversion of the input signals. The output of the audio input processor 18 is input to a digital signal processor (DSP) audio compression chip 20 which is standard. The output of the audio compression chip 20 is input into the PCI bus controller 12 which can place the compressed audio onto the PCI bus 14 for communication to the host computer 10. Returning to the video side, the output of the input video processor 16 is input to an ASIC 22 (Application Specific Integrated Circuit) which is one chip of a three chip video compression processor 23 also having a DTC based compression chip 24 and a motion estimator chip 26. The ASIC 22 handles signal transport, buffering and formatting of the video data from the input video processor 16 and also controls both the DTC based compression chip 24 and motion estimator chip 26. All of these chips are standard. An output of each of the chips 22, 24, and 26 of the video compression processor 23 is input to the PCI bus controller 12 for placing the compressed video on the PCI bus 14 for communication to the host computer 10.

The compressed video stream from the video compression processor 23 on the board undergoes lossless compression in the host computer using standard lossless compression techniques such as statistical encoding and run-length coding. After that lossless compression, the audio and video are multiplexed in standard fashion into a standard video signal. In order to have synchronization of audio and video the packets containing video and audio must be interleaved into a single bit stream with proper labeling so that upon playback they can be reassembled as is well known in the art.

Importantly, the errors that were calculated in the motion estimator 26 between the current frame and the predicted third subsequent frame are transmitted to the host computer 10 over the PCI bus 14 so they can be transmitted to the encoder (not shown) to recreate the current frame at the encoder using that error or difference signal and the motion vectors generated during motion estimation. This is standard in the art. In accordance with the motion estimation of the present invention, however, that error is also accumulated in the host computer in a software routine in accordance with the motion estimation techniques of the present invention.

Figure 18:
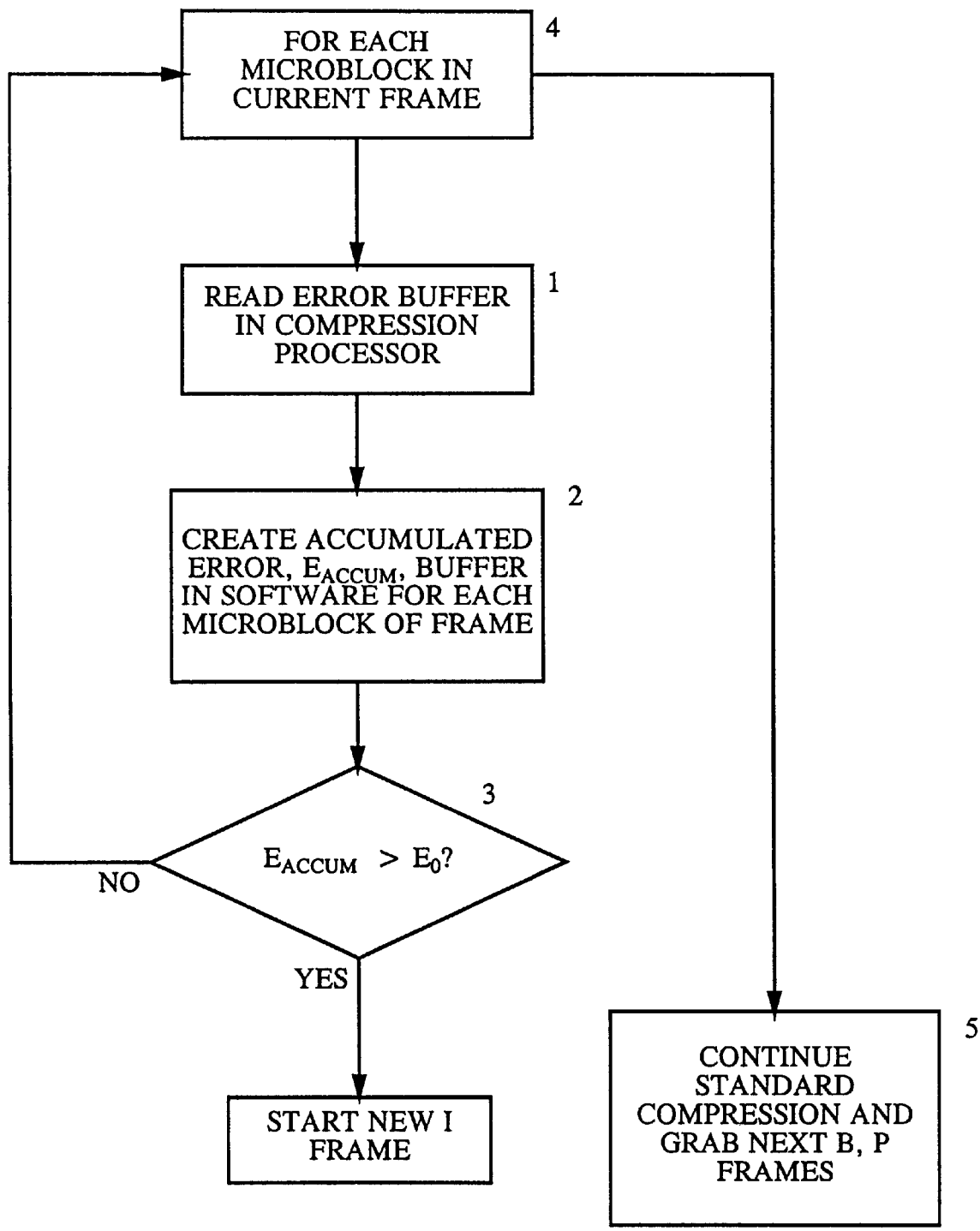
FIG. 18 is a flow chart of the error accumulation method of the present invention.

Referring now to FIG. 18, a flow chart describing error accumulation in the motion estimation procedure is shown. At Step 1 the error buffer in the compression processor 23 is read through the PCI bus 14. At Step 2 that error is accumulated in an error buffer created in software in the host computer 10 so that the accumulated error will equal the preexisting error plus the present error. At Step 3 the accumulated error is compared to a threshold error and if the accumulated error is larger than the threshold error then a new I frame is sent and the error buffer in the compression processor need not be read again for that particular frame. If the accumulated error is not greater than the threshold error then the process loops back up to Step 4 where the next subsequent microblock in that frame is chosen. If there is a subsequent microblock in that frame then the process repeats at Step 1 where the error buffer in the compression processor is read. That error is accumulated in the accumulated error buffer at Step 2 and that accumulated error is compared to threshold at Step 3. Note that this looping will continue from Steps 1, 2, 3, and 4 until at Step 3 the accumulated error exceeds the threshold at which point it is not longer necessary to check any more microblocks for that frame because the error became so high that the host computer determined that a new I frame should be sent to restart the motion sequence. If, on the other hand, the accumulated error for all the microblocks of an entire frame never exceeds the threshold, then after Step 4, the process will go to Step 5 and the standard MPEG compression process will continue without changes, i.e., the next B or P frame will be grabbed and compressed.

Automatic Target Recognition (ATR)

The ISMP still image compression methodology of the present invention can be used to greatly enhance automatic target recognition systems because the invention emphasizes and accurately represents the natural features such as "sculpture" of the object that makes human cognition of the target easier and more accurate. Furthermore, the polynomials used to represent the sculpture of the object are stable for small variations of projection direction or changes in movement, rotation, and scale of an object. This, too, enhances automatic target recognition.

Human vision defines objects principally by their contours. The human visual system registers a greater difference in brightness between adjacent visual images that are registered, faithfully recording the actual physical difference in light intensity. Researchers have shown that individual neurons in the visual cortex are highly sensitive to contours, responding best not to circular spots but rather to light or dark bars or edges. At it turns out, the fact that ISMP compression extracts exactly these edges and emphasizes the "sculpture" characteristic of the object makes it especially advantageous for use in ATR. By preserving object edges in the compressed information, the human visual system can extract important objects from a background even if the object has bulk colors very close to the colors of other objects in the background. This feature is extremely important for registration of military targets.

In virtually all ATR applications, the structures to be identified have sculpture. Consequently, the sculpture portion of the image can be extracted using the inventive methodology to achieve compression ratios of at least 4:1.

Unlike prior art methods based on linear methods and Fourier transforms like JPEG and wavelet, which destroy the very information which is essential for human cognition-soft edges, the present invention preserves those soft edges that exist in sculptures in virtually all structures to be identified. In contrast, the "texture" of an object is far less critical to human cognition. The present invention takes advantage of the distinction between sculpture and soft edges and texture by separating the sculpture characteristics of the object from the texture characteristics and utilizing only the sculpture information for ATR. An additional benefit of this methodology is that the sculpture information may be transmitted using relatively little bandwidth because it can be fully represented by polynomials whereas texture information requires greater bandwidth.

A preferred method of ATR involves separating the texture and sculpture portions of the image using the ISMP compression method, using standard soft ATR on the sculpture portion, and then using standard hard ATR methods on the entire image (both texture and sculpture). Another preferred method for ATR in accordance with the present invention is to split the texture and sculpture portions of the image using a portion of the ISMP compression method, using state of the art soft ATR methods on the sculpture part, and then using state of the art hard ATR methods on the texture part. This greatly reduces the number of bits that need to be transmitted because the texture information is dropped altogether. Quality, however, remains high because the sculpture portion of the image was derived using ISMP which retains all necessary soft edge information which is critical to human cognition. Such soft edge information would be eliminated or lost, in any event, if standard Fourier transform type compression methods are used.

There are numerous applications of ATR using datery obtained from the ISMP method. The datery can be used for autonomous object target detection, tracking, zooming, image enhancement, and almost real-time early stage recognition purposes. The present invention provides the capability for smart network-based cooperative scene processing such as in remote intelligent consolidated operators ("RICO") where information from remote camera networks must be transmitted over a smart local area network (LAN) which interconnects a number of camera platforms for cooperative wide area surveillance and monitoring. For example, a camera platform (with the inventive ISMP method embedded therein) can extract features of the objects seen such as critical soft edge information. It can transmit those images over a smart LAN to adjacent camera platforms. This process may provide cooperative scene information transmission outside the coverage of the original or any single camera platform. Through this process, observers of a scene can perceive the "big picture".

The images must then be transmitted from the remote camera network to a central station which may provide editing of film by computer to create the big picture. The invention will benefit such a system in two ways. First, because the ISMP compression method emphasizes the sculpture characteristics of the object, it enhances the ability to recognize the object imaged. Second, because the "sculpture" characteristics of the object are emphasized and represented using discrete numbers or coefficients from polynomials, the data sent is highly compressed which increases bandwidth significantly.

Another application is as an autonomous movie director where standard ATR is used and that information is compressed using the present invention for sending those images from the cameras to the central station. Because of the large volume of information that can be generated in such a system, the images must be compressed sufficiently so that they do not overwhelm the host computer. This is a real problem that is solved by the hypercompression of the present invention. These benefits apply to a wide range of systems including battlefield imaging systems and anti-terrorist recognition applications as well as full mapping capabilities.

Another significant advantage of the present invention is the ability to provide sufficiently high compression ratios for providing TV-class transmission through traditional air communication channels which are 64 kbps or less. In fact, the invention can provide such a significant compression ratio improvement of more than an order of magnitude that, generally speaking, "video through audio" is made possible. In other words, the present invention makes it possible for battlefield commanders and others to receive image information as opposed to raw data. And because the image information they receive is sent in the form of discrete numbers or coefficients of polynomials that relate to isomorphic singular manifolds in the object, the data are highly compressed. And although highly compressed, the data preserve full information about the objects 3-D boundaries or soft edges.

An example of a real-time remote engagement (RTRE) air scenario made possible because of the present invention includes providing an aviator who is approaching his target (at sea, on the ground, or in the air) with a short TV-relay from an overflying military communications aircraft or satellites that upgrades the present target location at the last minute. This can prevent an aviator from losing track of a highly mobile target. This is made possible because the data are highly compressed and can be sent over low bandwidth air channels of 64 kbps or less and because the information that is sent preserves edge information which makes it possible for the pilot to easily recognize his target.

Because the typical air communication channels are of low bandwidth, the ability to use all that bandwidth is critical. The present invention's ability to dynamically allocate bandwidth on demand permits the use of small fractions of standard 64 kbps bandwidths for bursty compressed video/graphic image transmission. A typical air communications channel must accommodate signals of different types such as imagery, audio, sensory data, computer data and synch signals etc. The higher level protocols of the network will prioritize these different signals. Conservatively speaking, imagery is one of the lowest priority because in most cases operations can continue without it. Therefore, imagery information typically is relegated to using only the bandwidth that is available and that available bandwidth changes with time. It is extremely useful to use the ISMP method of the present invention which can be implemented with a tunable compression ratio. This is distinct from software which changes compression ratio based on the type of the object. Furthermore, intelligence systems such as genetic algorithms or fuzzy logic and neural networks can provide intelligent control of the available bandwidth and permit imagery data to be sent where otherwise it was not possible to do so.

The severe constraints placed on the trade-off between the compression ratio and the PSNR by standard air channels of 64 kbps or less are highlighted by the following example. To compress data into the required data rate of 64 kbps from a fully developed synthetic aperture radar (SAR), for instance, uncompressed bandwidth of 13 Mbps, a 203:1 still image compression rate is needed. $(512)^2$ number of pixels, 10-bit grey level, and 5 Hz bursty frame rate, yields ($512^2 \times 10 \times 5 =$ 13 Mbps). The situation is made even more severe for VGA full-motion video (221 Mbps) which requires a 3452:1 motion video compression rate. The ability of the motion estimator of the present invention which inserts I frames only where the content of the video requires it can provide ten times better compression ratios than prior art systems, namely, up to 4000:1. Thus, signals from an SAR uncompressed bandwidth of 13 Mbps may in fact, for the first time be sent through 64 kbps channels. This is made possible by the non-intuitive use of Arnold's Theorem according to which local isomorphism (i.e., 1:1 direct and inverse relation) exists between the 3-D object boundary and its 2-D image. As a result, the most critical part of the object—its 3-D boundary may be described only by a 1-D contour and 3 or 4 natural digits that characterize a simple catastrophic polynomial. This creates tremendous lossless compression of object boundaries and still preserves high image quality. Experimental results show that the ISMP methodology of the present invention in contrast to state of the art compression methods can achieve a compression ratio of 160:1 at PSNR=38 Db with almost invisible artifacts whereas the prior art offers only CR=60:1 at a lower PSNR value of 26 Db. The difference in the image is significant.

Where far less than 64 kbps bandwidth channels are available, the hypercompression made possible by the present invention can permit continuity of images by "cartooning" which allows transmission of reduced real-time video-conferencing even on an 8 kbps communications channel.

Referring now to FIG. 19, FIG. 19 shows five categories of data reduction as a fraction of the original, five reduced data rates, and five different outcomes of those data rates. Category A represents 100% of the original which is a data rate of 64 kbps. At this data rate, the original video may be sent. Category B represents a data reduction as a fraction of the original 75% which is a 48 kbps data rate. The result of this transmission is that tiny details of the face or other structure are still recognizable and edges remain unchanged. Category C represents a data reduction of 50% as a fraction of the original which is a data rate of 32 kbps. The result of this transmission is that edges are hardened and there are smooth transitions for face details. Category D represents a 25% data reduction as a fraction of the original which is a reduced data rate of 16 kpbs. The result of this transmission is a heavily reduced texture and hard edges but it is still possible to recognize a human face. Category E represents a 10% reduction in data as a fraction of the original which is a reduced data rate of 12.8 kpbs. The result of this transmission is hard edges and "cartoon" type faces. While cartooning certainly does not provide optimum viewability, it may be more than adequate, for example, for soft ATR purposes where a tank need only be distinguished from a plane or other categories of objects and the type of model of each is not required to be determined. Additionally, it was not possible to send even cartoon type images over low bandwidth communication channels using prior art methods and therefore the ability to send a cartoon type image over that communication channel where no image was possible before is a great advance. Thus, depending upon the quality of transmission required and the application, the compression techniques of the present invention may be utilized to achieve a broad array of results heretofore unobtainable using prior art compression methods.

Various modes of carrying out the invention are contemplated as being within the scope of the following claims particularly pointing out and distinctly claiming the subject matter which is regarded as the invention.

We claim:

1. A method of compressing video, said method comprising the steps of:
   determining an actual error between corresponding blocks of a current frame and a predicted frame corresponding to the current frame;
   repeating said determining step for a successive pair of the corresponding blocks;
   accumulating the actual errors to generate an accumulated error;
   inserting an I-frame as the next subsequent frame after the current frame if said accumulated error exceeds a predetermined threshold; and
   repeating said first repeating, accumulating and inserting steps until said accumulated error exceeds said threshold.

2. A method of compressing video, said method comprising the steps of:
   taking a frame $F_0$ of the video;
   predicting a subsequent frame based on said frame $F_0$ and segmenting the predicted frame into search blocks;
   taking an input frame $F_1$ of the video, and segmenting the input frame $F_1$ into search blocks corresponding to the search blocks of said predicted frame;
   determining an actual error between corresponding search blocks of the input frame $F_1$ and the predicted frame;
   accumulating the actual errors of different ones of the corresponding search blocks on a block-by-block basis to generate an accumulated error; and
   comparing, after each accumulation of the errors, the accumulated error to a threshold and inserting an I-frame as the next subsequent frame if the accumulated error exceeds said threshold.

3. The invention as defined in claim 2, further comprising the steps of segmenting the frame $F_0$ into microblocks within said search blocks and normalizing the error by dividing by the number of microblocks.

4. The method as defined in claim 2, wherein said threshold is based upon video content.

5. The method as defined in claim 2, wherein said I frame is inserted in place of said frame $F_0$ if said error exceeds said threshold.

6. The method as defined in claim 2, further comprising the step of dynamically changing the compression ratio on a frame by frame basis based upon said error.

7. The invention as defined in claim 6, wherein one of a genetic algorithm, neural network, and fuzzy logic are used to determine the necessary change in compression ratio.

8. A method of compressed video transmission, the method comprising the steps of:
   taking a first frame $F_0$;
   segmenting said frame $F_0$ into blocks;
   compressing each said block by representing it with a canonical polynomial having original coefficients;
   predicting a frame P corresponding to said frame $F_0$;
   determining an error between each block in said frame $F_0$ and a corresponding block of said predicted frame P;
   accumulating the error determined between each block in said frame $F_0$ and said corresponding block of predicted frame P; and
   comparing, after accumulating each error, the accumulated error to a threshold and if the accumulated error exceeds said threshold, inserting an I-frame as the next subsequent frame to said frame $F_0$.

9. A method as defined in claim 8 wherein said I frame was previously compressed by representing it with canonical polynomials.

10. A method of compressed video transmission, the method comprising the steps of:
    taking a first frame $F_0$;
    segmenting said frame $F_0$ into blocks;
    compressing each said block by representing it with a canonical polynomial having original coefficients;
    predicting a frame P corresponding to said frame $F_0$ based on a frame prior to $F_0$;
    comparing each block in said frame $F_0$ with said predicted frame P to determine if there is a match;
    if a match is found in said frame P for a block in said frame $F_0$, sending said coefficients of said polynomial for that block to a decoder;
    if a match is not found for a block in said frame $F_0$, generating new coefficients of said polynomial representing said predicted frame P and sending said new coefficients to said decoder;
    reconstructing said frame $F_0$ in said decoder from said original coefficients and said new coefficients sent to said decoder;
    calculating an error between said frame $F_0$ and said predicted frame P based on said comparing each block in said frame $F_0$ with a corresponding block of said predicted frame P;
    comparing said error to a threshold;
    if said error does not exceed said threshold, sending a B or P frame as the next subsequent frame to said frame $F_0$;
    if said error exceeds said threshold, inserting an I-frame as the next subsequent frame to said frame $F_0$.

11. The method as defined in claim 10, further comprising the steps of replacing said original coefficients, and said new coefficients with an I frame.

12. A method of compressing a video image, said method comprising the steps of:
    taking a frame $F_0$;
    segmenting $F_0$ into blocks and defining motion vectors for said blocks to predict a subsequent frame P comprising a plurality of blocks;
    taking a subsequent frame $F_1$ of the video corresponding to said predicted frame P and segmenting $F_1$ into blocks corresponding to said blocks of said predicted frame;
    defining an actual error between each said block in said frame $F_1$ and said corresponding block in said frame P;
    accumulating the actual errors one error at a time to generate an accumulated error;
    based on said accumulated error, sending an I-frame as the next subsequent frame to said frame $F_0$; and
    repeating said defining, accumulating and sending steps for each corresponding pair of blocks of said frame $F_1$ and said frame P.

13. A method of video compression utilizing motion estimation comprising the steps of:
    (a) comparing a segment of the current frame to be encoded to a corresponding segment of the previous frame to arrive at an error difference;
    (b) repeating the calculation of Step (a) until error differences have been determined for all segments of the frame;
    (c) summing said error differences to arrive at a cumulative error difference for that frame;

(d) comparing said cumulative error difference to a threshold and inserting a new I frame if said cumulative error exceeds said threshold.

14. The method of claim 13 further comprising adjusting the compression ratio on a frame by frame basis based on feedback and further using such feedback to change parameters of the compression engine.

15. The method of claim 13 further comprising lowering bandwidth by increasing the compression ratio based on feedback indicating that there is a high bit error rate.

16. The method of claim 14 wherein the change in compression ratio and bandwidth are determined by one of, a genetic algorithm, a neural network and fuzzy logic.

17. The method of claim 13 further comprising the step of presetting said threshold based upon the program content or type of video images to be compressed such as action, documentary, or nature.

18. A method of video compression, said method comprising the steps of:

deriving a plurality of errors between microblocks in a current frame of video and corresponding microblocks in a predicted frame;

accumulating said errors to generate an accumulated error;

comparing said accumulated error to a threshold after each said error is added to said accumulated error; and sending an I frame when said threshold is exceeded.

19. The method of claim 18 further comprising sending the I frame as the current frame so as to replace error data.

20. The method of claim 18 wherein the threshold is varied in accordance with statistical information of the video based on program content such as the number of cuts, the amount of action, etc.

21. The method of claim 18 further comprising varying said threshold by using genetic algorithms.

22. The method of claim 18 further comprising varying said threshold by using fuzzy logic.

23. A method of video compression, said method comprising the steps of:

deriving a plurality of errors between microblocks in a current frame of video and corresponding microblocks in a predicted frame;

accumulating said errors to generate an accumulated error;

comparing said accumulated error to a threshold after each said error is added to said accumulated error;

sending an I frame when said threshold is exceeded; and applying spatial hypercompression utilizing isomorphic singular manifold representations to each I frame inserted into the video bitstream.

24. A method of compressing video, said method comprising the steps of:

(a) calculating the actual error between a first block of a current frame and a corresponding block of a predicted frame;

(b) storing the calculated actual error as a first block actual error;

(c) calculating the actual error between a second block of the current frame and a corresponding block of the predicted frame to create a second block actual error;

(d) adding the second block actual error to the stored first block actual error to create an accumulated actual block error;

(e) calculating the actual error between a subsequent block of the current frame and a corresponding block of the predicted frame to create a subsequent block error;

(f) adding the subsequent block actual error to the accumulated actual block error to create a new accumulated actual block error;

(g) repeating steps (e) and (f) with respect to each additional subsequent block of the current frame, one at a time, until the accumulated actual error exceeds a predetermined threshold; and (h) inserting an I-frame if the accumulated actual block error or the new accumulated actual block error exceeds the threshold.

* * * * *